United States Patent
Fedele

(10) Patent No.: US 9,623,519 B1
(45) Date of Patent: Apr. 18, 2017

(54) COFFEE FILTER FABRICATION METHOD

(71) Applicant: Voice Systems Technology, Inc., Harvard, MA (US)

(72) Inventor: Vincent Fedele, Harvard, MA (US)

(73) Assignee: Voice Systems Technology, Inc., Harvard, MA (US)

( * ) Notice: Subject to any disclaimer, the term of this patent is extended or adjusted under 35 U.S.C. 154(b) by 303 days.

(21) Appl. No.: 14/622,823

(22) Filed: Feb. 13, 2015

Related U.S. Application Data

(60) Division of application No. 13/080,651, filed on Apr. 5, 2011, which is a continuation-in-part of application No. 12/915,004, filed on Oct. 28, 2010, now Pat. No. 9,565,966.

(51) Int. Cl.
A47J 31/06 (2006.01)
B23P 15/16 (2006.01)
B01D 24/00 (2006.01)

(52) U.S. Cl.
CPC ............... B23P 15/16 (2013.01); A47J 31/06 (2013.01); A47J 31/0657 (2013.01); B01D 24/001 (2013.01); A47J 31/0663 (2013.01); B01D 23/005 (2013.01); Y10T 29/49604 (2015.01)

(58) Field of Classification Search
CPC . Y10T 29/49604; A47J 31/06; A47J 31/0657; A47J 31/0663; B01D 24/001; B01D 23/005
See application file for complete search history.

(56) References Cited

U.S. PATENT DOCUMENTS

| | | | | |
|---|---|---|---|---|
| 5,150,645 A | * | 9/1992 | Schiettecatte | A47J 31/4496 99/295 |
| 5,447,631 A | * | 9/1995 | Mahlich | A47J 31/0663 210/455 |
| 5,649,472 A | * | 7/1997 | Fond | A47J 31/0673 426/433 |
| 5,744,780 A | * | 4/1998 | Chang | B23K 26/032 219/121.68 |
| 6,044,183 A | * | 3/2000 | Pryor | A01B 69/008 382/287 |

(Continued)

FOREIGN PATENT DOCUMENTS

JP 07278617 A * 10/1995

*Primary Examiner* — Jermie Cozart
(74) *Attorney, Agent, or Firm* — Mark P Kahler

(57) ABSTRACT

A coffee filter includes a metallic member having a flat portion in which tapered exit regions are formed that extend from the bottom of the flat portion to vertices interior to the flat portion. The flat portion is provided with a hole uniformity enhancement region between the top of the flat portion and the exit region vertices that are interior to the flat portion. The top of the flat portion is micro-machined to remove a part of the hole uniformity enhancement region to a predetermined depth into the hole uniformity enhancement region. Holes are formed in the top of the flat portion extending from the micro-machined top of the flat portion through the hole uniformity enhancement region to the vertices of the tapered exit regions. The predetermined depth of the micro-machined top of the flat portion is selected to prevent the micro-machined top of the flat portion from meeting the tapered exit regions to promote and maintain uniformity of the holes.

24 Claims, 28 Drawing Sheets

(56) References Cited

U.S. PATENT DOCUMENTS

| | | | |
|---|---|---|---|
| 6,220,147 B1* | 4/2001 | Priley | A47J 31/0615 |
| | | | 99/299 |
| 2005/0172819 A1* | 8/2005 | Chen | A47J 31/4496 |
| | | | 99/279 |

* cited by examiner

200
FILTER QUALIFYING SYSTEM

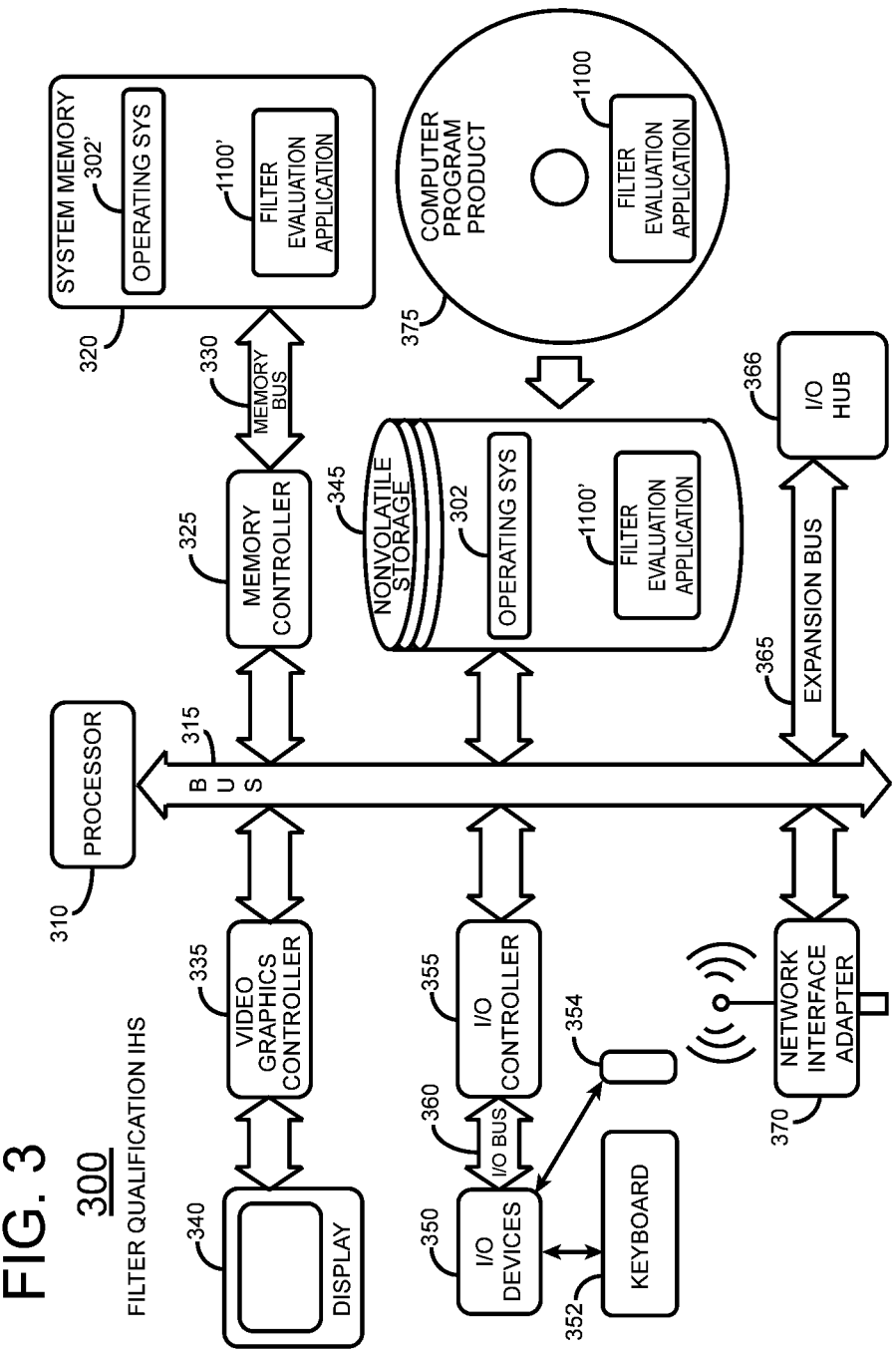

FAIL

FAIL

FAIL

PASS

PASS

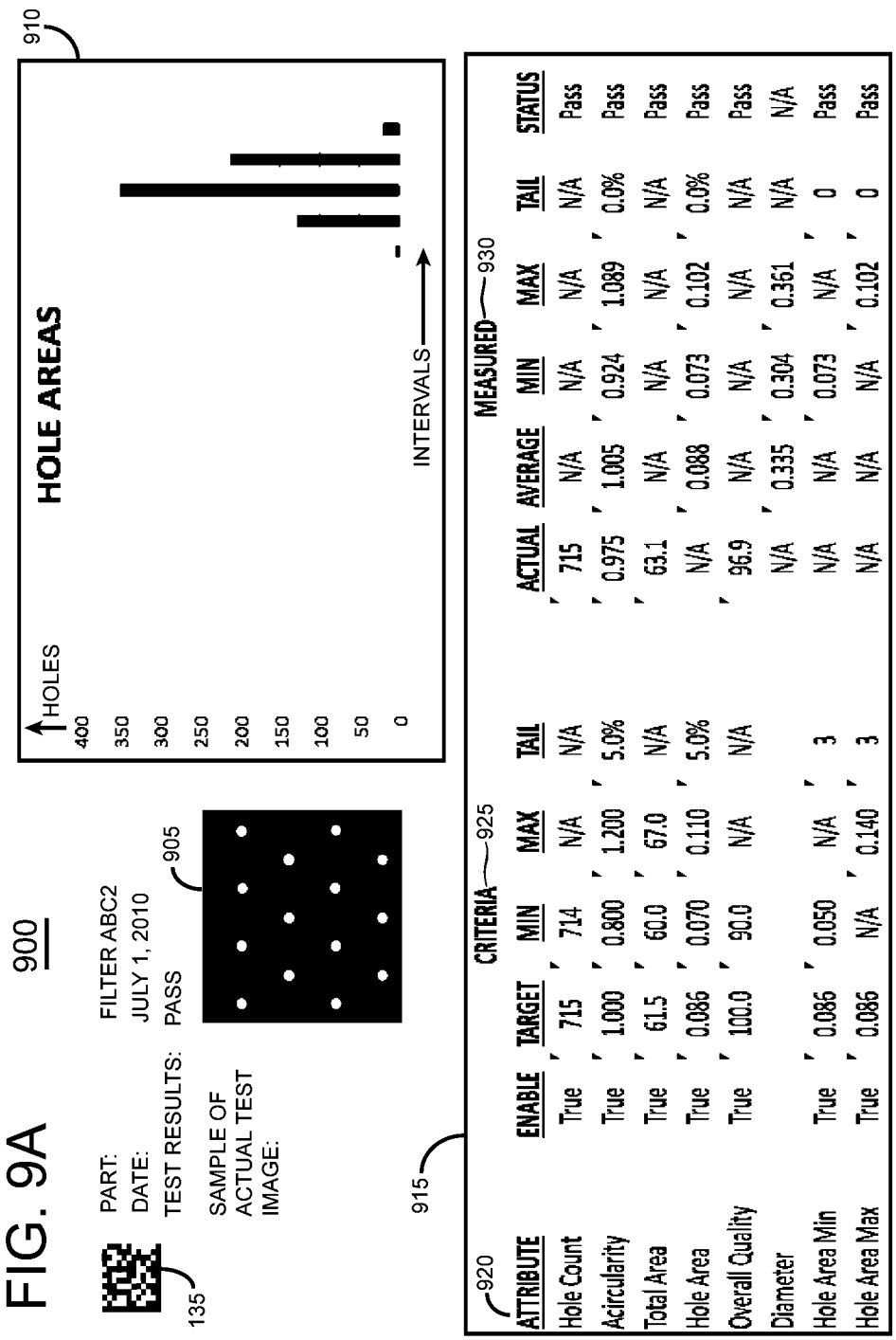

FIG. 9C

| INTERVALS | AREA BINS | RAW AREA | RAW DIAMETER | RAW ACIRCULARITY |
|---|---|---|---|---|
| 0.000-0.005 | 0 | 0.1024149 | 0.361107577 | 1.043739935 |
| 0.005-0.010 | 0 | 0.1006318 | 0.357950285 | 0.964230008 |
| 0.010-0.015 | 0 | 0.0990495 | 0.35512497 | 0.982258691 |
| 0.015-0.020 | 0 | 0.0988984 | 0.354854022 | 0.950373713 |
| 0.020-0.025 | 0 | 0.099675 | 0.356244594 | 0.986051387 |
| 0.025-0.030 | 0 | 0.0988518 | 0.354770348 | 0.952896893 |
| 0.030-0.035 | 0 | 0.098041 | 0.353312466 | 0.954731569 |
| 0.035-0.040 | 0 | 0.0976681 | 0.352639973 | 1.016349948 |
| 0.040-0.045 | 0 | 0.0981738 | 0.353551592 | 1.017511403 |
| 0.045-0.050 | 0 | 0.0975332 | 0.352396208 | 1.020725633 |
| 0.050-0.055 | 0 | 0.096491 | 0.350508478 | 1.000135311 |
| 0.055-0.060 | 0 | 0.097662 | 0.352628842 | 0.968172619 |
| 0.060-0.065 | 0 | 0.0988451 | 0.354758405 | 1.068973125 |
| 0.065-0.070 | 0 | 0.0961227 | 0.349838896 | 0.997721276 |
| 0.070-0.075 | 1 | 0.0991155 | 0.355243327 | 1.035792571 |
| 0.075-0.080 | 4 | 0.0977237 | 0.352740304 | 1.011135195 |
| 0.080-0.085 | 128 | 0.0964514 | 0.350436565 | 1.011815988 |
| 0.085-0.090 | 349 | 0.096996 | 0.351424414 | 1.014522011 |
| 0.090-0.095 | 211 | 0.0978377 | 0.352946002 | 1.015418441 |
| 0.095-0.100 | 20 | 0.0982964 | 0.35377225 | 1.044350832 |
| 0.100-0.105 | 2 | 0.0945395 | 0.346945881 | 0.983355579 |

US 9,623,519 B1

COFFEE FILTER FABRICATION METHOD

PRIORITY CLAIM AND CROSS REFERENCE TO RELATED PATENT APPLICATIONS

This patent application is a divisional of, and claims priority to, the U.S. Patent Application entitled "Coffee Filter Fabrication", inventor Vincent Fedele, application Ser. No. 13/080,651, filed Apr. 5, 2011, which is still pending and that is a continuation-in-part of, and claims priority to, the U.S. Patent Application entitled "Coffee Filter Qualification Apparatus and Methodology", inventor Vincent Fedele, application Ser. No. 12/915,004, filed Oct. 28, 2010, now U.S. Pat. No. 9,565,966 B2 and that is assigned to the same Assignee as the subject patent application, both of which are incorporated herein by reference in their entirety for all purposes.

TECHNICAL FIELD OF THE INVENTION

The disclosures herein relate generally to brewing liquids, and more particularly to the filters used in brewing beverages such as coffee and espresso.

BACKGROUND

Quality standards in the specialty coffee industry established during the 1950's and 1960's that coffee extraction of approximately 20% (usually a range of ~18-22%) will achieve the best quality brewed coffee, using various brew methods. Over the ensuing years these established standards have been generally referred to as the gold-cup standard, and have been accepted internationally by many institutions, educational establishments, and standards committees. The precise extraction (solubles yield) and strength (solubles concentration) may be varied for particular coffees to achieve finely tuned recipes for particular coffee cultivars, climates and growing regions, also known as terroir, and other characteristics.

Extraction (solubles yield) refers to the percentage of the dry coffee by weight that is removed by dissolving in water during the brewing process. Up to 30% of the available soluble solids in ground coffee can be extracted, with most of the remaining 70% being cellulose, and not soluble in water. However, generally speaking, extracting more than 22% will begin to sharply increase those components in coffee that contribute to bitter taste defects associated with over-extraction. Extracting less than 18% is generally associated with weak, under-developed taste defects often associated with sour taste defects, especially at higher concentrations, such as with espresso.

The finished brew is a balance between extraction (solubles yield) served at the desired strength (solubles concentration). Over-extracting, which results in taste defects known as bitter, can be known as strong-bitter at higher concentrations, or weak bitter at lower concentrations. Similarly, under-extracting, which results in taste defects known as sour or under-developed, can be known as strong-under-developed at higher concentrations, or weak under-developed at lower concentrations. The highest quality coffee will have rich aroma, fullness of body, delicacy of flavor as well as clarity and unique character—all optimally balanced. Achieving these attributes requires a significant degree of precision during the coffee brewing process.

Strength (solubles concentration) refers to the measured amount of solids extracted into the final coffee solution. Strength may be expressed as the percentage total dissolved solids (% TDS). For example, for 100 grams of a coffee measuring 8.5% TDS, there are 91.5 grams of water, and 8.5 grams of dissolved coffee solids in solution.

To brew coffee, such as espresso, a specific dose of selected ground coffee is uniformly distributed and tamped into an espresso basket filter. Water heated to a predetermined temperature and pressure is injected through the coffee basket filter while the shot of espresso coffee is brewed into a cup or other vessel. In order to obtain maximum sweetness, aroma, body and flavour, it is desirable for the barista or other user to be able to consistently pull shot after shot of high quality coffee with uniform concentration and extraction yield.

SUMMARY

Accordingly, in one embodiment, a method of fabricating a coffee filter is disclosed. The method includes forming a plurality of tapered exit regions in a substantially flat first portion of a metallic member, the substantially flat first portion including first and second opposed major surfaces. The plurality of tapered exit regions extends from the second major surface of the substantially flat first portion to respective vertices interior to the substantially flat first portion. The method also includes providing a hole uniformity enhancement region extending between the first major surface of the substantially flat first portion and the vertices of the plurality of exit regions. The method further includes forming respective holes that extend from the vertices of the plurality of tapered exit regions through the hole uniformity enhancement region to the first major surface of the substantially flat first portion. The method still further includes micro-machining the first major surface of the substantially flat first portion to remove a part of the hole uniformity enhancement region to a predetermined depth into the hole uniformity enhancement region, thus forming a micro-machined first major surface, wherein the predetermined depth is selected to prevent the micro-machined first major surface from meeting the tapered exit regions to maintain uniformity of the holes.

Accordingly, in one embodiment, another method of fabricating a coffee filter is disclosed. The method includes forming a plurality of tapered exit regions in a substantially flat first portion of a metallic member, the substantially flat first portion including first and second opposed major surfaces. The plurality of tapered exit regions extends from the second major surface of the substantially flat first portion to respective vertices interior to the substantially flat first portion. The method also includes providing a hole uniformity enhancement region extending between the first major surface of the substantially flat first portion and the vertices of the plurality of exit regions. The method further includes micro-machining the first major surface of the substantially flat first portion to remove a part of the hole uniformity enhancement region to a predetermined depth into the hole uniformity enhancement region, thus forming a micro-machined first major surface. The method still further includes forming respective holes that extend from the micro-machined first major surface of the substantially flat first portion through the hole uniformity enhancement region to the vertices of the plurality of tapered exit regions. The predetermined depth of the micro-machined first major surface is selected to prevent the micro-machined first major surface from meeting the tapered exit regions to maintain uniformity of the holes.

In another embodiment, a coffee filter is disclosed. The disclosed coffee filter includes a cup-shaped member with a bottom joined to a cup side wall, the cup-shaped member having an open top. The bottom of the cup-shaped member exhibits a predetermined thickness and includes first and second opposed major surfaces, wherein the first major surface faces the open top and the second major surface faces away from the open top. The cup-shaped member also includes a plurality of tapered exit regions that extend from the second major surface of the bottom to respective vertices interior to the bottom. The cup-shaped member further includes a hole uniformity enhancement region between the vertices of the plurality of exit regions and the first major surface of the bottom. The cup-shaped member still further includes respective holes that extend from the vertices of the plurality of tapered exit regions through the hole uniformity enhancement region to the first major surface of the bottom. In one embodiment, the hole uniformity enhancement region exhibits a sufficient thickness to prevent the plurality of tapered exit regions from extending to the first major surface of the bottom.

In yet another embodiment, a coffee machine is disclosed. The coffee machine includes a vessel for holding water. The coffee machine also includes a heater that heats the water in the vessel to a predetermined temperature and a pump that pumps the water in the vessel to a predetermined pressure. The coffee machine further includes a head that couples to the vessel to receive water at the predetermined temperature and the predetermined pressure from the vessel. The coffee machine still further includes a coffee filter holding mechanism that couples to the head to hold a coffee filter adjacent the head, the coffee filter including a cup-shaped member. The cup-shaped member includes a bottom joined to a cup side wall, the cup-shaped member having an open top. The bottom of the cup-shaped member exhibits a predetermined thickness and includes first and second opposed major surfaces, wherein the first major surface faces the open top and the second major surface faces away from the open top. The cup-shaped member also includes a plurality of tapered exit regions that extend from the second major surface of the bottom to respective vertices interior to the bottom. The cup-shaped member further includes a hole uniformity enhancement region between the vertices of the plurality of exit regions and the first major surface of the bottom. The cup-shaped member also includes respective holes that extend from the vertices of the plurality of tapered exit regions through the hole uniformity enhancement region to the first major surface of the bottom.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 3 is a block diagram of a filter qualification information handling system (IHS) that the disclosed filter qualification apparatus may employ. The system may be fixed or portable.

FIG. 9A is a representation of a summary report that accompanies a filter that passes the filter evaluation and qualification process.

FIG. 9C shows further additional information that may be added to the report of FIGS. 9A and 9B to provide a more detailed report.

DETAILED DESCRIPTION

A. Liquid Brewing Filter Qualification System

Figure 1A:
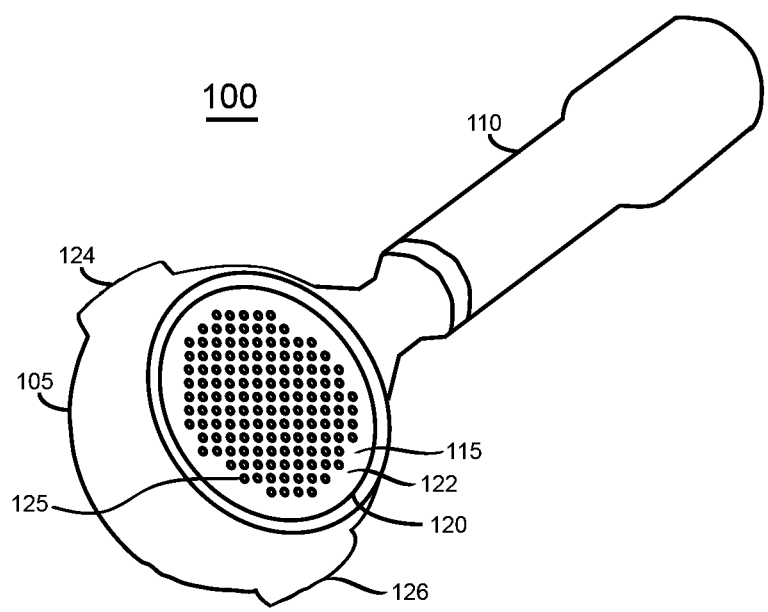
FIG. 1A is a perspective view of a typical porta-filter assembly that is depicted holding the disclosed removable liquid brewing filter with the bottom of the assembly cut-away to make the filter viewable from the bottom. This filter, seen through the bottom cut-away, may be tested and qualified in accordance with the disclosed filter qualification apparatus and methodology.
Figure 1B:
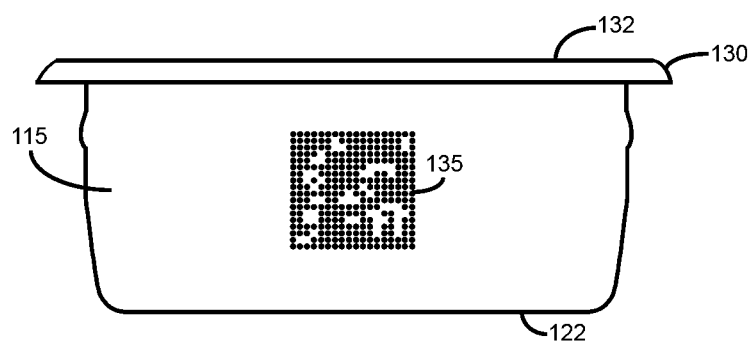
FIG. 1B is a side view of the disclosed removable liquid brewing filter of FIG. 1A including a unique marking code.

FIG. 1A is a perspective view of a filter assembly 100 that includes a porta-filter holder 105 attached to a handle 110. In FIG. 1A, the bottom of portafilter 105 is cut-away at cut-away portion 120 to more clearly show the disclosed filter 115 that is retained in holder 105. In FIG. 1A, a bottom portion 122 of filter 115 is visible through the cut-away portion 120 in the bottom of filter holder 105. Filter assembly 100 may be placed in a brewing apparatus such as a coffee brewing machine or espresso machine when brewing is desired, the filter assembly 100 being locked in place using a bayonet mount with flanges such as opposed flanges 124 and 126. Super Automatic espresso machines use a filter like filter 115, but of different shape and size, wherein the filter is employed without an external filter assembly. Such a brewing machine forces heated water at a predetermined temperature and pressure through a puck of coffee placed in filter 115. The liquid exiting filter 115 is the resultant brewed beverage. As seen in FIG. 1B, filter 115 may be cup-shaped to enable filter 115 to hold the ground coffee. Filter 115 and filter holder 105 may be fabricated from metal such as food grade stainless steel, AISI 304 or similar. Filter 115 may also be referred to as an espresso coffee filter basket or portafilter insert or a portafilter basket. The bottom 122 of filter 115 includes multiple apertures or holes 125 through which the brewed liquid flows. Filter 115 may include hundreds of apertures 125, the number of apertures depending on the cross-sectional area of each aperture and the particular coffee brewing application. In this particular embodiment, filter 115 includes a rim 130 at top 132 of filter 115, as well as a retaining ridge shown and discussed later with reference to FIG. 12C as retaining ridge 149 to hold the filter firmly in the portafilter handle assembly via retaining clip 146. Filter assembly 105 may also be referred to as a portafilter.

Figure 2:
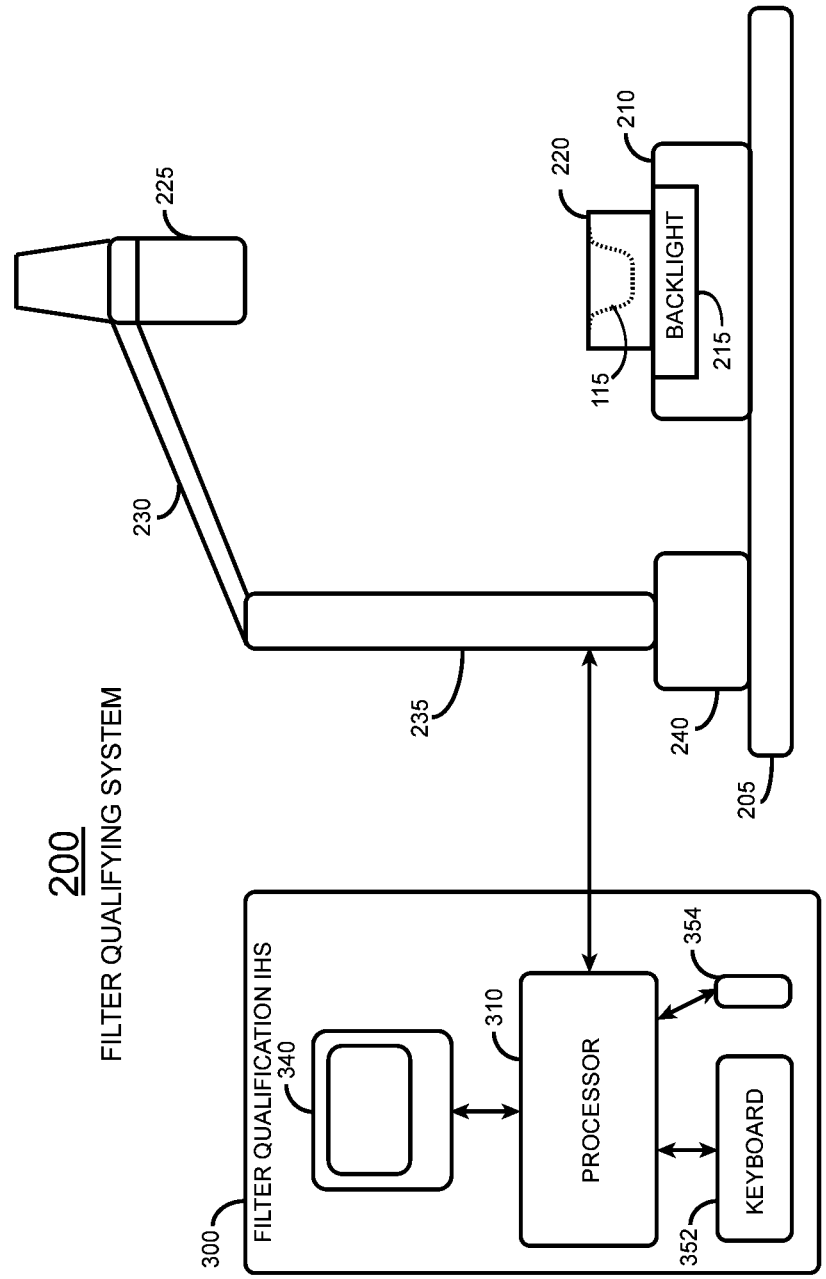
FIG. 2 is a block diagram of the disclosed filter qualification apparatus that may be fixed or portable.

FIG. 2 shows the disclosed coffee basket qualification system 200 that may be used to critically test and evaluate the acceptability of a particular coffee filter 120 for brewing purposes. It has been found that the lack of uniformity in coffee basket filters, particular with respect to the size and geometry of the holes of the filter, can cause considerable difficulty when attempting to brew espresso coffee uniformly and consistently cup-to-cup at similar concentrations and extraction yields. This inconsistency may occur even when using filters of the same type and model due to significant variations from filter to filter. The flow of liquid through a coffee filter is determined by a number of factors. For example, the particle size and amount of coffee in the filter both impact the liquid flow rate through the filter. Tamping, water pressure, temperature and overall gicleur size also impact flow rates. These factors are under the control of the machine manufacturer, barista or other user. However, a number other factors, not in control of the user, also impact the liquid flow rate and ultimately may have a dramatic impact on the resultant brew, such as the overall size, shape, uniformity and quantity of the filter holes.

It has been found that some coffee filters, even when new, may include burrs and other occlusions of the holes in the filter. It is also possible that defective holes may be come clogged (fail to clear) with coffee sediments during use over an extended period of time. These inconsistencies affect the flow rate of brewed liquid through the filter and thus impact the quality of the resultant brewed liquid. For example, if a coffee filter is designed with holes exhibiting a diameter of 300 μm and the total cumulative area of 707 holes is designed to be 50 mm$^2$, but due to fabrication defects the actual filter exhibits a total cumulative area of 20 mm$^2$, then these filters are going to significantly reduce flow, and produce undesired results. The typical result is that a user will adjust the grade of grind, making the coffee more coarse, in order to restore flow rates to normal. However, making the coffee more coarse causes significant under-extraction, and sour taste defects because there is less surface area from the ground particles to extract from, while at the same time, flow is faster, both of which work to reduce the extraction yield. Improper fabrication during the hole making process may result in some or all holes being too small or too large, or some holes be blocked or partially occluded with undesired metallic materials left by the faulty manufacturing process.

Many brewing machines may have multiple brewing stations, or groups, each with their own filter assembly 100. During normal use, the filter assemblies 100 may be swapped randomly into any available group head position. Since each portafilter assembly 100 includes its own unique filter 115, different filters may be returned to different group positions in the machine. It has been found that, unless the filters within these filter assemblies are uniform in terms of total hole cumulative area and hole geometry, the resultant brewed coffee will exhibit highly inconsistent quality from shot to shot, because the primary adjustment will be that of changing grind. Since most users rely on a single high quality grinder, it may frequently be set for one filter, and not work for another filter, thus resulting in poor consistency, frequent trial and error and wasted coffee product and efficiency. If the barista or other user observes that the brewed liquid flows through the filter too quickly, then the barista may try to compensate by grinding the coffee finer. If the barista observes that the brewed liquid is flowing through the filter too slowly, then the barista may attempt to compensate by grinding the coffee more coarsely. Either approach is likely to cause the resultant brewed liquid to exhibit unacceptable qualities, such as bitter or sour taste defects because the true problem of filter inconsistency is not being appreciated or understood. Considerable time and coffee product is wasted as an operator struggles to keep each position dialed-in, due to each filter requiring a different grind setting. Because espresso is typically up to ten times the concentration of typical brewed coffee, the taste defects associated with under- or over-extraction are similarly much more pronounced. Under-developed becomes very sour, over-extracted becomes very bitter. Both of these defects are often offset using milk and or sugar products. However, if brewed correctly, most freshly roasted coffees will taste naturally sweet, without added sweeteners. If the intent is to have similar filters in all group positions, all 14 gram capacity filters, for example, then it is crucial they perform similarly in order for the finished beverage to be the same from shot to shot, regardless of which filter is used in which position.

FIG. 2 is a representation of the disclosed filter qualifying system 200. Filter qualifying system 200 tests a coffee filter 115 by imaging and then measuring by computer machine vision the details of the coffee filter holes to determine if the filter meets predetermined test standards including hole circularity, range of acceptable areas or diameters and total cumulative hole area. When a group or production run of coffee filters exhibits the same hole circularity and the same total cumulative hole area, then these filters will perform similarly under the same brewing conditions (dose, weight, grind, time, temperature, pressure, and gicleur opening). The total cumulative hole area significantly impacts the flow of brewed liquid through the filter. Imaging system 200 employs very high resolution sub-pixel technology to image the apertures of the filter. In one embodiment, imaging system 200 is capable of resolution within the range of 5-25 microns per pixel. Filter qualifying system 200 includes an optical bench 205. A work base 210 including a diffused or collimated light source 215 is situated on optical bench 205 at a predetermined location. A filter holder 220 is situated on top of backlight 215 at a predetermined location. Filter holder 220 can be used either manually as single unit filters or as an automated feed system designed to deliver hundreds of filters per minute. Filter holder 220 positions and holds filter 115 in proper alignment as shown (filter 115 shown in dashed lines) during imaging. A high resolution, sub-pixel machine vision imaging camera 225 is positioned above filter 115 in a position enabling camera 225 to digitally image each filter 115. Camera 225 is mounted to optical bench 205 via flexible arm 230, column 235 and pedestal 240, with adjustments and locking fixtures, as shown. In another embodiment, camera 225 may employ a concentric lens to the system size to enable a portable system, with closer working distances, or may employ a contact imager camera 225 without a lens, both of which can reduce or eliminate off-axis aberrations, thus improving accuracy and resolution.

A filter qualification information handling system (IHS) 300 couples to camera 225 by wire or wirelessly to control the imaging of filter 115 and to receive a high resolution digital image of the filter 115 from camera 225. Image IHS 300 includes a processor 310 that couples to a display 340. User input devices, such as keyboard 352 and pointing device 354, couple to processor 310. More detail with respect to filter qualification IHS 300 is shown in FIG. 3. The image of a particular filter can be stored together with a detailed test report, and referred to at a future date for comparison.

FIG. 3 is a block diagram of an IHS that may be used as filter qualification IHS 300. IHS 300 includes a filter evaluation application 1100 that programs and configures IHS 300 to control imaging camera 225 when it images filter 115. Filter evaluation application 1100 also programs and configures IHS 300 to evaluate filter image information received from imaging camera 225 to determine those particular filters that meet predetermined filter criteria. In this manner, IHS 200 may sort and separate those filters that pass the criteria from those filters that fail the criteria, or it may grade filters to ranges of accuracy that are matched within specific groups of selected criteria.

Filter qualification IHS 300 includes a processor 310 that may include multiple cores. IHS 100 processes, transfers, communicates, modifies, stores or otherwise handles information in digital form, analog form or other form. IHS 100 includes a bus 315 that couples processor 310 to system memory 320 via a memory controller 325 and memory bus 330. In one embodiment, system memory 320 is external to processor 310. System memory 320 may be a static random access memory (SRAM) array or a dynamic random access memory (DRAM) array. Processor 310 may also include local memory (not shown) such as L1 and L2 caches (not shown). A video graphics controller 335 couples display 340 to bus 315. IHS 300 presents a graphical user interface (GUI) 300 to the user on display 340. Nonvolatile storage 345, such as a hard disk drive, CD drive, DVD drive, or other nonvolatile storage couples to bus 315 to provide IHS 300 with permanent storage of information. I/O devices 350, such as a keyboard 352 and a mouse pointing device 354, couple to bus 315 via I/O controller 355 and I/O bus 360.

One or more expansion busses 365, such as USB, IEEE 1394 bus, ATA, SATA, PCI, PCIE, DVI, HDMI and other busses, couple to bus 315 to facilitate the connection of peripherals and devices to IHS 300. An input/output hub 366, such as a USB hub, couples other devices (not shown) to expansion bus 365. A network interface adapter 370 couples to bus 315 to enable IHS 300, acting as a local communication device, to connect by wire or wirelessly to other IHSs and/or machine vision imaging camera 225. In this embodiment, network interface adapter 370 may also be called a network communication adapter, a network adapter, or communication hardware. While FIG. 3 shows one IHS that employs processor 310, the IHS may take many forms. For example, IHS 300 may take the form of a desktop, server, portable, laptop, notebook, netbook, tablet or other form factor computer or data processing system. IHS 300 may take still other form factors such as a gaming device, a personal digital assistant (PDA), a portable telephone device, a communication device or other devices that include a processor and memory.

IHS 300 includes a computer program product, namely filter evaluation application 1100, on digital media 375 such as a CD, DVD or other media. In one embodiment, a designer, manufacturer, user or other entity installs filter evaluation application 1100 on nonvolatile storage 345 to practice the disclosed filter evaluation and qualification methodology. In practice, IHS 300 may store an operating system 302 (OPERATING SYS) and filter evaluation application 1100 on nonvolatile storage 345 as operating system 302 and filter evaluation application 1100', respectively. When IHS 300 initializes, the IHS loads operating system 302 into system memory 320 for execution as operating system 302'. IHS 100 also loads filter evaluation application 1100' into system memory 320 as filter evaluation application 1100".

Figure 4A:
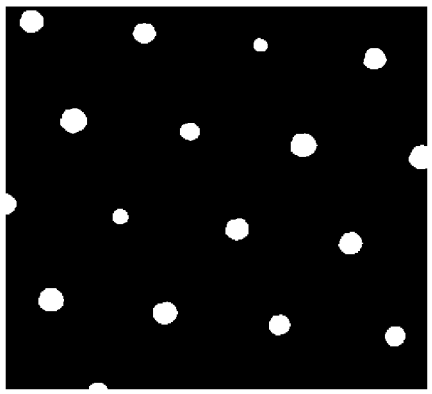
FIG. 4A-4E show images of portions of the apertures of different filters, some of which conform to predefined criteria for aperture size and uniformity and others of which fail those criteria.
Figure 4B:
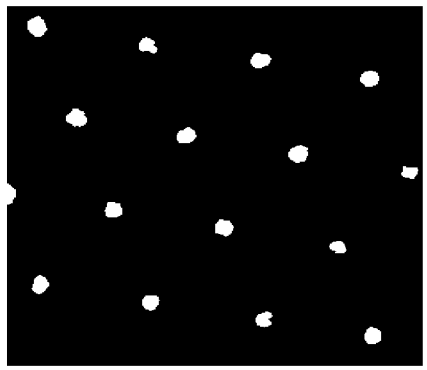
Figure 4C:
Figure 4D:
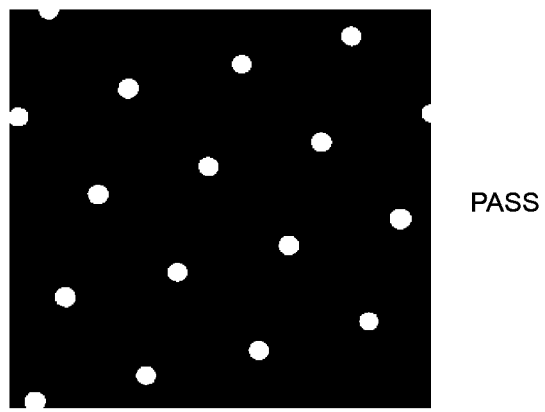
Figure 4E:
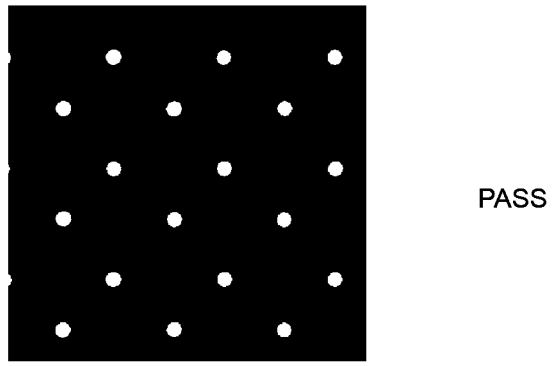

FIG. 4A-4E show images of portions of the apertures of different filters, some of which conform to predefined criteria for aperture size and geometric uniformity and others of which fail these criteria. These images are derived from the output of imaging camera 225 that is provided to filter qualification IHS 300 in digital form. FIG. 4A is an image of a portion of a filter with inconsistent hole size. Some hole diameters are relatively large while other hole diameters are relatively small. Many of these hole diameters substantially vary from a predefined hole diameter criteria and thus fail to qualify as acceptable filters. FIG. 4B is an image of a portion of a filter wherein some of the holes exhibit partial occluding with burrs from the filter machining process. These filters fail to qualify as acceptable filters because they exhibit hole non-uniformity, non-circularity, and/or insufficient total square area. FIG. 4C is an image of a portion of a filter wherein some of the holes exhibit substantial occlusion and are blocked by burrs from the filter machining process. These filters fail to qualify as acceptable filters because they exhibit substantial hole non-uniformity, non-circularity, and/or insufficient total square area. FIG. 4D is an image of a portion of acceptable filter that meets and passes predetermined criteria for hole circularity and hole area. FIG. 4E is an image of a portion of another acceptable filter that meets criteria for a different hole circularity and hole area associated with a different filter model.

Figure 5A:
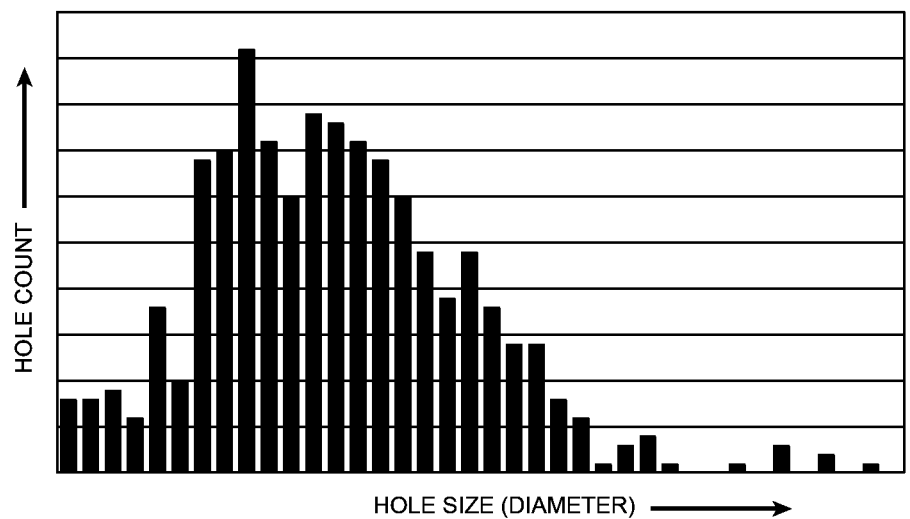
FIG. 5A-5B show histograms respectively of a filter with a wide distribution of aperture or hole size and a filter with a more desirable narrow distribution of aperture or hole size.
Figure 5B:
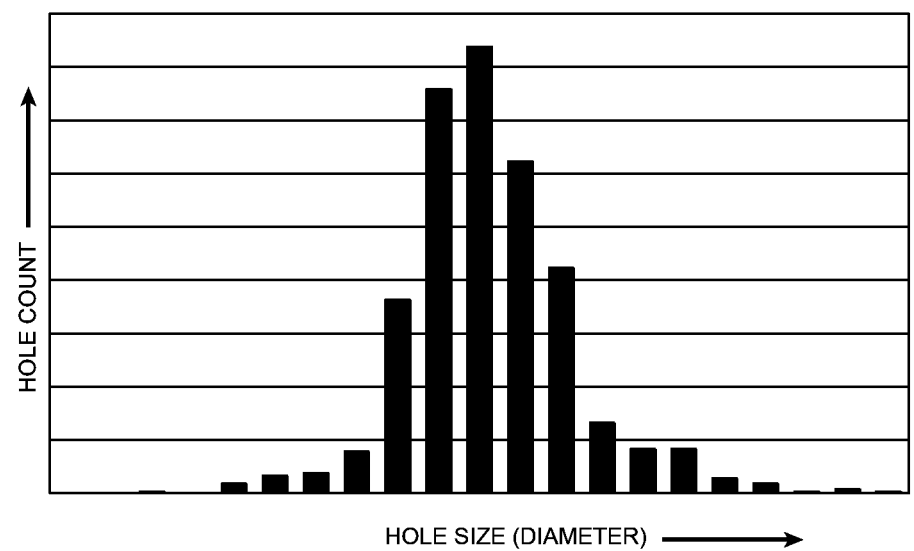

FIG. 5A is a histogram that filter qualifying system 200 may generate to depict how closely a particular filter conforms to a predetermined criterion for hole area size, e.g.

diameter. In an ideal filter, all holes would exhibit the same area or diameter with uniform circularity. As seen in FIG. 5A, this particular histogram represents a filter that exhibits a broad range of diameters that would be expected to perform poorly, or in a difficult to predict manner. Filter qualifying system 200 may employ input parameters or criteria that instruct system 200 to reject such a filter as unacceptable. FIG. 5B shows a histogram for a particular filter that exhibits a much narrower distribution of hole size, thus conforming more closely to the criteria for a desirable filter than the filter of FIG. 5A. Filter qualifying system 200 may employ input parameters that instruct system 200 to pass such a filter as acceptable. The multiple input parameters or user-specified criteria to which a filter should conform to be an acceptable filter in system 200 are discussed in more detail below. The histograms that system 200 generates are useful to determine filter quality and compliance with closely matched filter specifications. The histogram of FIG. 5A is representative of a filter that fails to meet acceptable filter criteria, whereas the histogram of FIG. 5B is representative of a filter that meets acceptable filter criteria.

Figure 6:
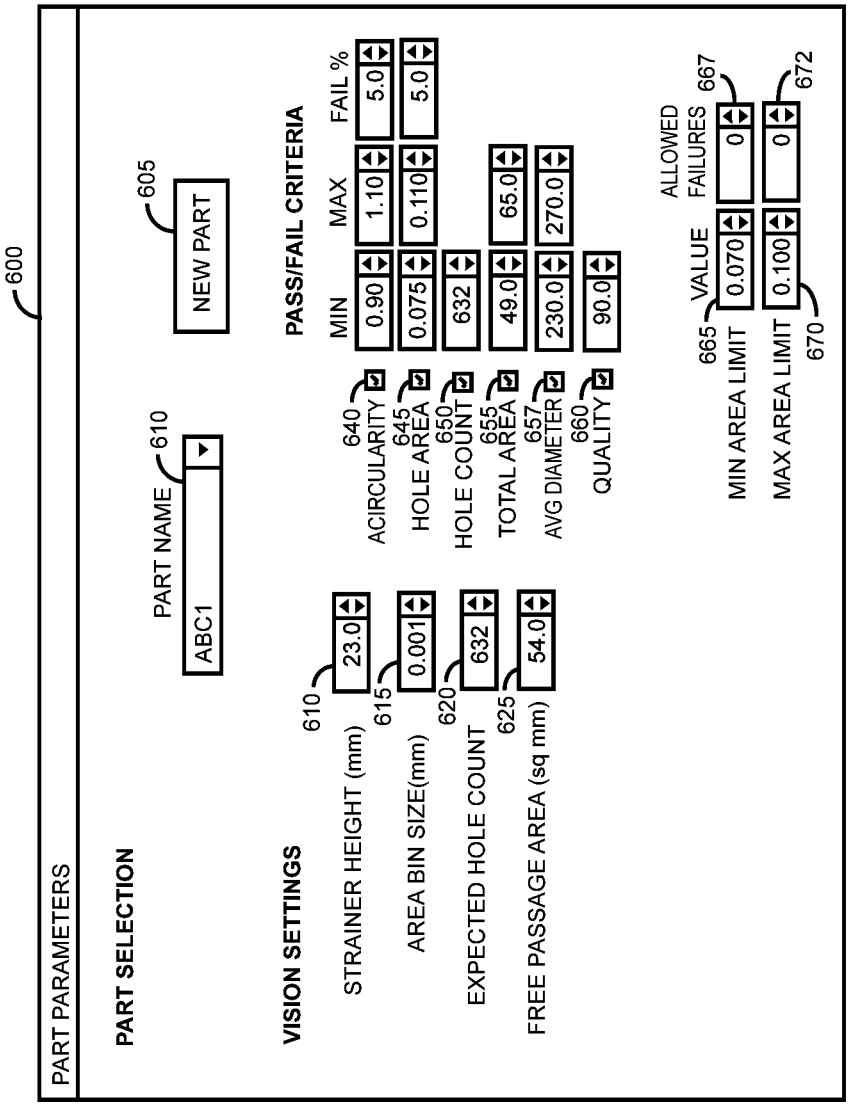
FIG. 6 is an input parameter screen shot that the disclosed filter evaluation application may generate on a display to enable the user to provide filter criteria for filter testing and qualification purposes.

FIG. 6 is a screen shot of a parameter input screen 600 that filter evaluation application 1100 generates on display 340 to enable a user to input filter parameters and criteria to filter qualification IHS 300. To provide parameters for a new part, previously not provided to IHS 300, a user selects NEW PART box 605. If test parameters for a part under test were previously input to IHS 300, then the user may access those parameters by selecting that part name in PART NAME box 610.

Assuming that the user previously provided input filter parameters for a part named "ABC1" to filter qualification IHS 300, the user may recall those settings by selecting ABC1 in PART NAME box 610. The parameters that were input include STRAINER HEIGHT, namely the height of filter 115 as measured from the bottom of the filter where holes 125 are located to the top of rim 130. Input parameters also include AREA BIN SIZE. AREA BIN SIZE is the hole class size interval for use with a histogram for evaluating range of hole sizes, and may be specified in diameter or area. The EXPECTED HOLE COUNT is another input parameter. EXPECTED HOLE COUNT is the expected number of holes in the particular filter under test. If the expected hole count is 500 and this criterion is set to 499, then one blocked hole is allowed. FREE PASSAGE AREA 625 is an input parameter that refers to the total desired cumulative area for all holes of the particular filter summed together.

Other input parameters that define an acceptable filter include a number of PASS/FAIL CRITERIA seen in the rightmost portion of parameter input screen 600. For example, an ACIRCULARITY parameter 640 refers to the amount of acceptable acircularity, or non-circularity, that each hole may exhibit. ACIRCULARITY parameter 640 includes selectable MIN and MAX values and a selectable FAIL % that the user may set as desired. Acircularity is important because high acircularity (or low circularity) can be an indicator of a hole forming process that has failed, as a tool degrades, causing total cumulative area to degrade. This is a good indicator, when used with other accompanying measurements, that a hole forming tool needs to be changed, before parts such as coffee filters degrade to the point of failure. Testing for acircularity may ensure high yields and minimized waste of materiel and labor. HOLE AREA parameter 645 refers to the acceptable range of area that each hole is allowed to exhibit. HOLE AREA parameter 645 includes selectable MIN and MAX values and a selectable FAIL % that the user may set as desired. HOLE COUNT 650 is the input parameter that refers to the number of holes that IHS 300 should detect in order to determine an acceptable filter. If the design for a particular filter includes 632 holes, then filter qualification IHS 300 should detect 632 holes. TOTAL AREA 655 is the input parameter that specifies the total cumulative area, with selectable MIN and MAX values, of all holes summed together that IHS 300 should detect in order to determine an acceptable filter. AVG DIAMETER 657 is the average diameter input parameter that specifies the average diameter of the holes in filter 115, with selectable MIN and MAX values. Different filters will have different hole average diameters values. For example, a filter with 769 holes may exhibit a hole average diameter of 375 microns with an allowed range of 325 to 425 microns. Another filter with 632 holes may include holes that exhibit a hole average diameter of 250 microns with an allowed hole average diameter range of 230 to 270 microns. QUALITY 660 is the input parameter that specifies the overall acceptable quality that a particular filter should exhibit to pass qualification. The quality parameter is computed from a combination of control limits including Sigma (the standard deviation of individual data points) divided by the square root of n (the sample size) multiplied by limits u.

Each of parameters 640, 645, 650, 655 and 660 include respective check boxes to enable them so that these parameters may be selected or deselected as desired. In one embodiment, those parameters selected by a check in the respective check boxes are considered as criteria in the pass/fail decision, whereas unselected parameters are not consider as criteria in this decision.

MIN AREA LIMIT 665 is the input parameter that refers to the minimal allowable area that a hole should exhibit, as a hard limit on quantity allowed. The user may specify the number of allowable failures in the adjacent ALLOWED FAILURES box 667. MAX AREA LIMIT 670 is the input parameter that refers to the maximum allowable area that a hole should exhibit. The user may specify the number of allowable failures in the adjacent ALLOWED FAILURES box 672.

Figure 7A:
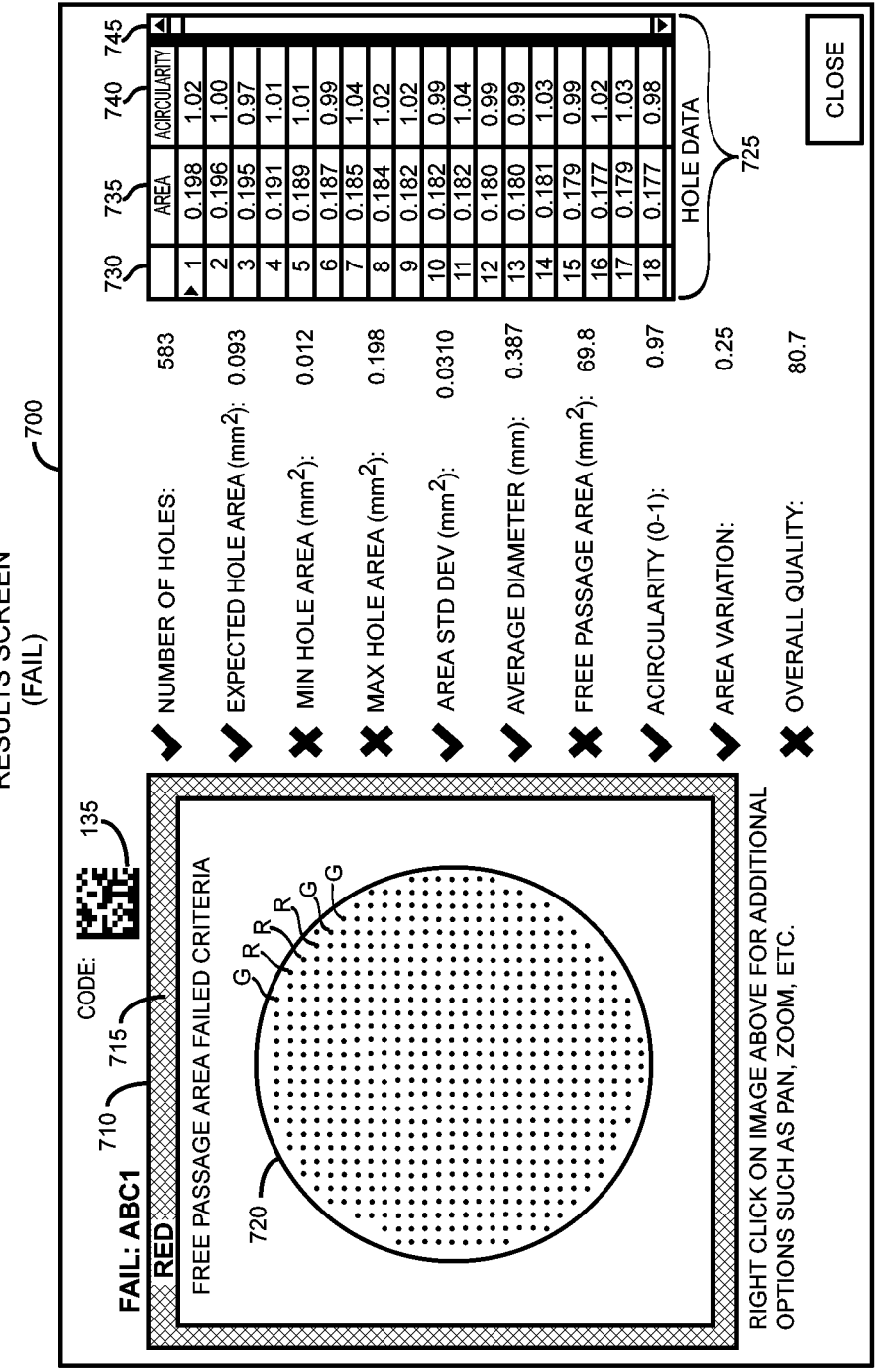
FIG. 7A is a screen shot of a display showing a results analysis for a failing filter. Each criterion of the display shows a check mark if passed, or an X if failed, to assist in evaluation.

FIG. 7A is a screen shot of a results screen 700 that filter qualification IHS 300 may generate on display 340 when a particular filter ABC1 fails qualification testing, showing why the filter failed, which may include one or more criteria. Results screen 700 includes a reproduction of the unique 2 dimensional code 135 that is applied to each coffee filter 115 before qualification testing. Results screen 700 includes an image portion 710 including a margin 715 and the actual image 720 taken by imaging camera 225. Filter evaluation application 1100 marks each hole in the filter depicted in image 720 red (R) if it falls outside of specified filter criteria and green (G) if it the hole is within the specified filter criteria. Other colors can be assigned to ranges of test criteria, such as hard limit criteria. The letters R and G are used to simulate red and green respectively for representative holes in image 720 of FIG. 7A for purposes of example. A legend at the bottom of image portion 710 instructs the user to click on the image for additional options such as pan and zoom for inspection of edge details or to identify where a tool is replicating hole defects on all filters.

Results screen 700 reports the NUMBER OF HOLES detected as 583, with the adjacent checkmark indicating that this number was within the input criteria. Results screen 700 also reported the EXPECTED HOLE AREA ($mm^2$) as 0.093, with the adjacent checkmark indicating that this number was within the input criteria. Results screen 700 further reported the MIN HOLE AREA ($mm^2$) as 0.012, with the adjacent "X" indicating that this number was not within the input criteria. Results screen 700 still further reported the MAX HOLE AREA (mm$^2$) as 0.198, with the adjacent "X" indicating that this number was not within the input criteria.

Results screen 700 reports the AREA STD DEV (mm$^2$), namely the area standard deviation, or spread values, as 0.0310, with the adjacent checkmark indicating that this number was within the input criteria. Results screen 700 reports the AVERAGE DIAMETER (mm), namely the average diameter of all of the holes, as 0.387 with the adjacent checkmark indicating that this number was within the input criteria. Results screen 700 also reports the FREE PASSAGE AREA (mm$^2$), namely the total cumulative area of all of the holes summed, as 69.8, with the adjacent "X" indicating that this number was not within the input criteria. Results screen 700 further reports the ACIRCULARITY (0-1), namely the average acircularity of the holes of the filter, as 0.97 with the adjacent checkmark indicating that this number was within the input criteria. Results screen 700 reports the AREA VARIATION, namely sigma/mu a method for evaluation area spread of large sets of data, as 0.25 with the adjacent checkmark indicating that this number was within the input criteria. Results screen 700 reports the OVERALL QUALITY as 80.7, with the adjacent "X" indicating that this number was not acceptable and that the particular filter is rejected.

The rightmost portion of results screen 700 depicts hole data 725 for each of the holes that filter evaluation application 1100 detected in filter ABC1. Hole data 725 includes a holes column 730 that lists each of the 583 holes detected in filter ABC1 by number from 1 to 583. Adjacent each hole's number is a respective AREA data value in AREA column 735 and a respective ACIRCULARITY data value in ACIRCULARITY column 740. A scroll bar 745 enables the user to scroll up and down to view the data for the holes 19-583 which are off-screen in the particular view depicted in FIG. 7A. Other hole data may be included, such as diameter, access by a horizontal scroll bar (not shown).

Figure 7B:
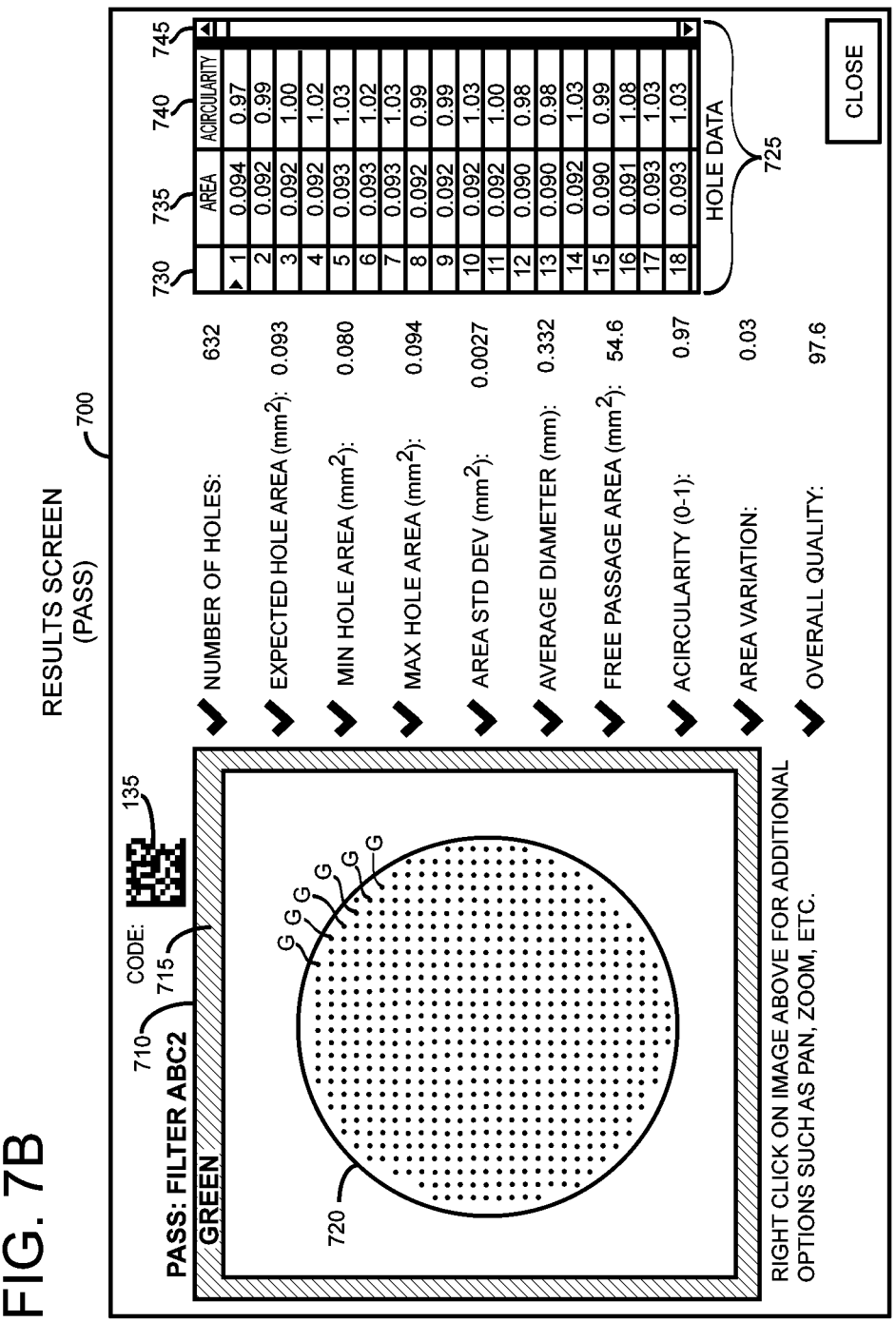
FIG. 7B is a screen shot of a results screen for a passing filter.

FIG. 7B is a screen shot of a results screen 700 that filter qualification IHS 300 may generate on display 340 when a different particular filter ABC2 passes qualification testing. In this example, the margin 715 of image portion 170 is green, thus indicating a PASSED filter. Results screen 700 again includes a reproduction of the unique 2 dimensional code 135 that is applied to each coffee filter 115 before qualification testing. The unique 2D code 135 of filter ABC2 of FIG. 7B is different from the unique 2D code 135 of filter ABC1 of FIG. 7A. Moreover, filter ABC2 of FIG. 7B is a different model filter with a different number of holes and different filter input criteria. Like numbers indicate like elements and constructs when comparing FIG. 7B with FIG. 7A. Filter evaluation application 1100 marks each hole in the filter depicted in image 720 red (R) if it falls outside of specified filter criteria and green (G) if it the hole is within the specified filter criteria. In the particular filter ABC2 shown in FIG. 7B, all holes are marked green as represented by the G's marked on image 720.

Results screen 700 reports the NUMBER OF HOLES detect as 632, with the adjacent checkmark indicating that this number was within the input criteria. Results screen 700 also reported the EXPECTED HOLE AREA (mm$^2$) as 0.093, with the adjacent checkmark indicating that this number was within the input criteria. Results screen 700 further reported the MIN HOLE AREA (mm$^2$) as 0.080, with the adjacent checkmark indicating that this number was within the input criteria. Results screen 700 still further reported the MAX HOLE AREA (mm$^2$) as 0.094, with the adjacent checkmark indicating that this number was within the input criteria.

Results screen 700 reports the AREA STD DEV (mm$^2$), namely the area standard deviation, as 0.0027, with the adjacent checkmark indicating that this number was within the input criteria. Results screen 700 reports the AVERAGE DIAMETER (mm), namely the average diameter of all of the holes, as 0.332 with the adjacent checkmark indicating that this number was within the input criteria. Results screen 700 also reports the FREE PASSAGE AREA (mm$^2$), namely the total cumulative area of all of the holes summed, as 54.6, with the adjacent checkmark indicating that this number was within the input criteria. Results screen 700 further reports the ACIRCULARITY (0-1), namely the average acircularity of the holes of the filter, as 0.97 with the adjacent checkmark indicating that this number was within the input criteria. Results screen 700 reports the AREA VARIATION as 0.03 with the adjacent checkmark indicating that this number was within the input criteria. Area Variation ($\sigma\mu$) is a quantity that is a statistical measure of the collection of areas of all the holes found in the filter. The AREA VARIATION is defined to be the standard deviation of the hole areas divided by the mean of the hole areas. This can also be referred to as the normalized variation of hole areas. Results screen 700 reports the OVERALL QUALITY as 97.6, with the adjacent checkmark indicating that this number was acceptable and that the particular filter is passed. The OVERALL QUALITY (Q) of a coffee filter is defined as follows:

$$Q=100*(\text{acircFactor}+(1.0-\text{areaVariation})+(1.0-\text{FreePassageAreaError}))/3.0$$

wherein
  acircFactor=1.0/(1.0+aveAcircularityError)
  areaVariation=(Standard Deviation of Hole Areas)/(Mean of Hole Areas)
  FreePassageAreaError=AbsoluteValue of ((TotalAreaOfHoles−ExpectedFreePassageArea)/ExpectedFreePassageArea))
  The ExpectedFreePassageArea is defined by the user for each strainer type.
  aveAcircularityError=TotalAcircularityError/NumberOfHoles
  TotalAcircularityError is the sum for all holes of the Absolute Value of (acircularity−1.0).
  For each hole, acircularity=perimeter^2/(4×pi×Area)

The rightmost portion of results screen 700 depicts hole data 725 for each of the holes that filter evaluation application 110 detected in filter ABC2. Hole data 725 includes holes column 730 that lists each of the 632 holes detected in filter ABC2 by number from 1 to 632. Adjacent each hole's number is an respective AREA data value in AREA column 735 and a respective ACIRCULARITY data value in ACIRCULARITY column 740. The scroll bar 745 enables the user to scroll up and down to view the data for holes 19-632 that are off-screen in the particular view depicted in FIG. 7B. Other hole data may be displayed, such as diameter, accessed by a horizontal scroll bar (not shown).

Figure 8A:
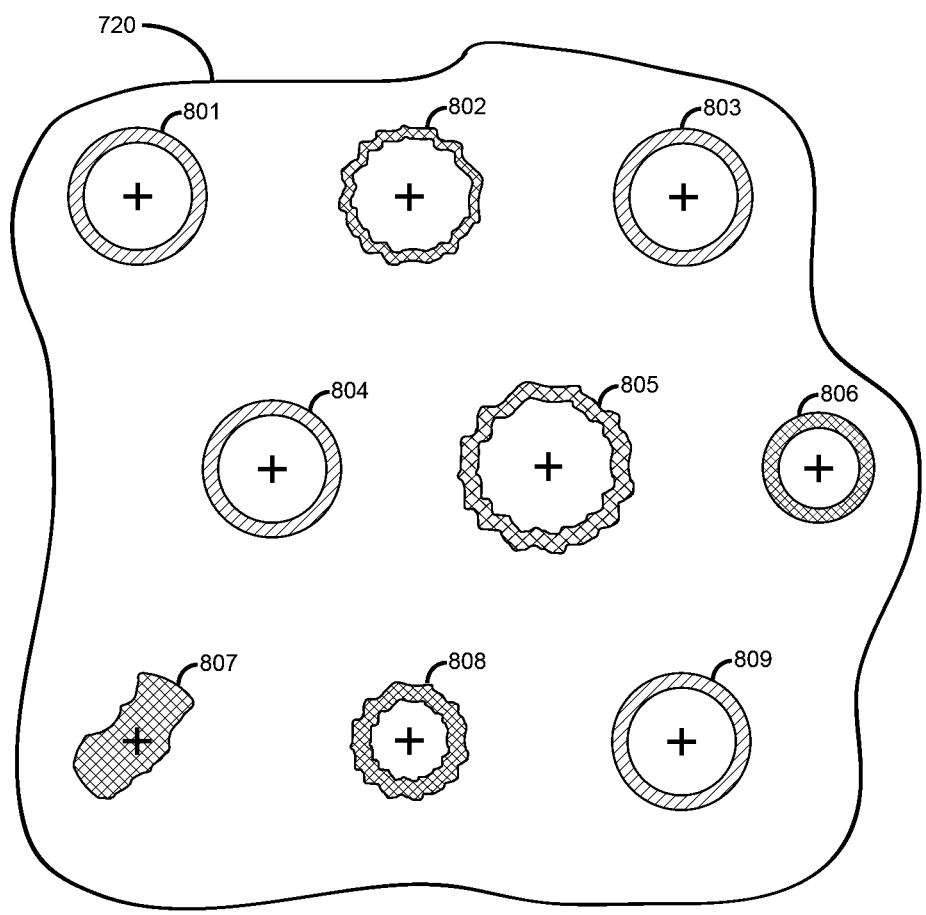
FIG. 8A is a zoomed-in view of the image of a failing filter that the disclosed filter evaluation application may generate for a filter.

FIG. 8A is a representation of a portion of the filter image seen on display 340 when the user elects to zoom in on filter 115 by selecting that option by right clicking or other action as indicated in FIG. 7A. Recalling that FIG. 7A depicts the filter FAIL scenario, when the user instructs filter evaluation application 1100 to zoom in on filter image 720, application 1100 generates an image such as shown in FIG. 8A. Filter evaluation application 1100 locates the center of each of the holes and places an X at each center, as seen in FIG. 8A.

Filter evaluation application 1100 analyzes the digital image data received from camera 225 and determines the edge surface of each of the holes. Application 1100 marks the edges green following the outline of each hole, indicated by single hatching in FIG. 8A, if the hole is circular and meets input criteria.

However, if application 1100 determines that a particular hole does not meet input criteria, then it marks the edge of that hole red, as indicated by cross hatching, such as shown in FIG. 8A. In the particular example depicted, holes 801, 803, 804 and 809 are all circular and pass the input criteria. Thus, these holes are outlined in green (single hatching). However, hole 802 exhibits acircularity that is outside the specified input criteria and thus its irregular edge surface is marked in red (cross hatching) on display 340. Hole 805 is both too acircular and too large, and for these two reasons does not meet the specified input criteria. Thus, the edge surface of hole 805 is marked in red (cross hatching). While hole 806 meets the acircularity criteria, it is too small in diameter to pass the specified input criteria. For this reason, the edge surface of hole 806 is marked in red (cross hatching). Hole 807 is substantially occluded and meets neither acircularity nor hole area input criteria. Thus, the edge surface of hole 807 is marked in red (cross hatching). Hole 808 fails both acircularity and minimum hole size criteria. For this reason, the edge surface of hole 808 is marked in red (cross hatching) thus indicating its failure to pass.

Figure 8B:
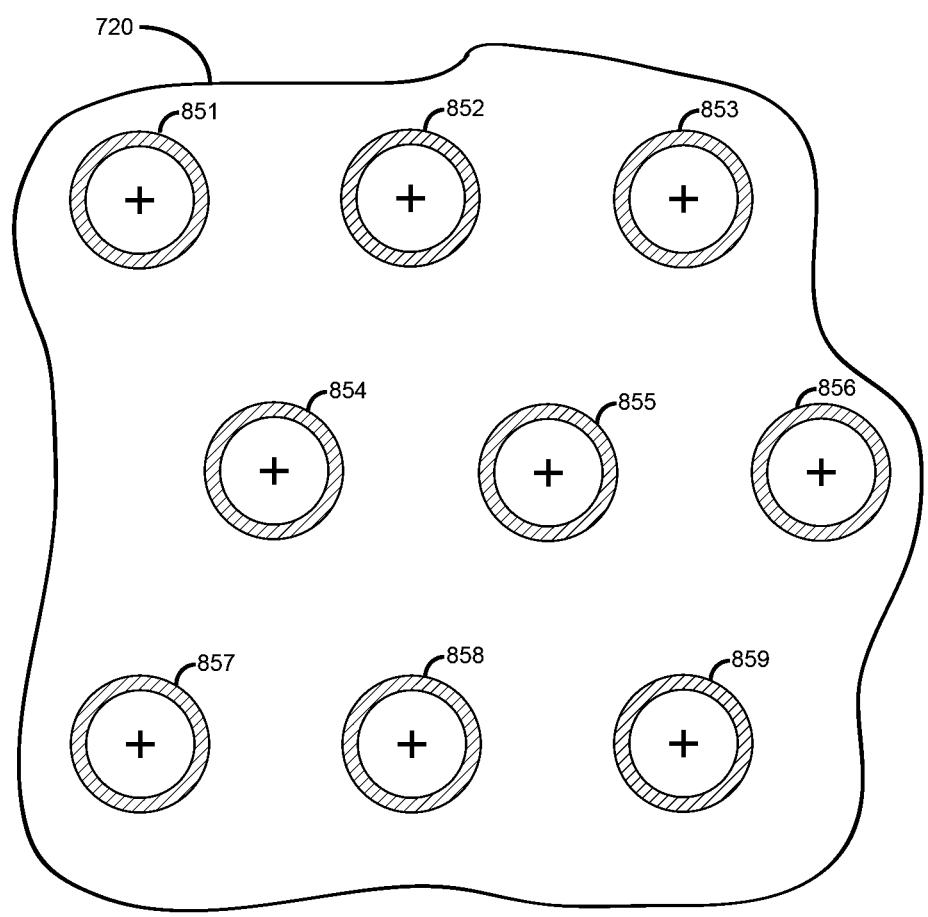
FIG. 8B is a zoomed-in view of the image of a passing filter that the disclosed filter evaluation application may generate for a filter.

FIG. 8B is a zoomed-in view similar to that of the failing filter of FIG. 7A, except that FIG. 8B depicts the passing filter of FIG. 7B. For this reason, filter qualification application 100 colors the edges of all of holes 851-859 of the filter of FIG. 8B green (single hatching) to indicate that all holes meet the specified input criteria.

FIG. 9A is a representation of a summary report 900 that accompanies a filter that passes the filter evaluation and qualification process. Summary report 900 includes the unique 2D code 135 that identifies the particular filter. Summary report 900 identifies this particular filter part as FILTER ABC2 and lists the test results as PASS adjacent 2D code 135. Summary report 900 also may include a sample of the actual test image 905 generated by filter qualification IHS 300. In one embodiment, summary report includes a hole area distribution histogram 910 that filter qualification application 1100 generates. The histogram shows the actual number of holes vs. class intervals, namely hole area ranges. In other words, histogram 910 depicts the number of holes in the filter that fall into different area ranges from small hole areas to large hole areas. A narrow distribution such as seen in histogram 910 is desirable and is one attribute of a passing filter. In addition, it provides a method of quickly and effective evaluating the quality of the tooling producing the parts, and can be set to thresholds that will indicate when such tools have deteriorated to the point they need to be replaced.

The summary report 900 of FIG. 9A also includes a chart 915 that depicts the selected input CRITERIA 925, namely attributes, and the resultant MEASURED results 930 as output. These attributes include hole count, acircularity, total area (cumulative area), hole area (individual hole area), overall quality, hole diameter, hole area minimum (min) and hole area maximum (max) as seen in attribute column 925.

Figure 9B:
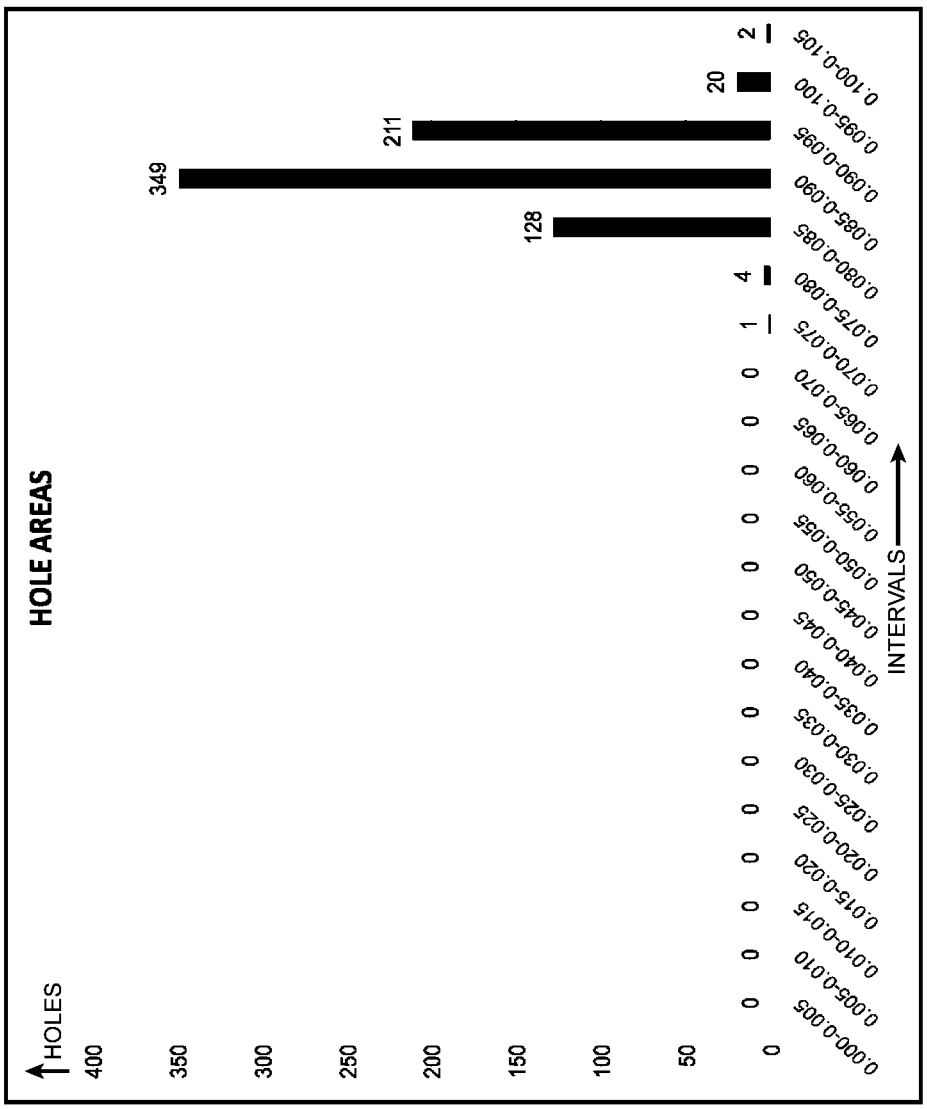
FIG. 9B shows additional information that may be added to the report of FIG. 9A to provide a more detailed report.

FIG. 9B includes a detailed hole area histogram that when added to the report of FIG. 9A and the hole data chart of FIG. 9C forms a detailed report that may be provided to the user or other entity. The histogram of FIG. 9B is similar to histogram 910 of FIG. 9A, except that the histogram of FIG. 9B shows the actual hole size ranges, i.e. class intervals, along the horizontal axis of the histogram. FIG. 9C is a chart which includes the actual raw data that filter qualification application 1100 uses to generate the detailed histogram of FIG. 9B. The data and distribution plots are applied using a statistical analysis rule for normally distributed data, following the central limit theorem that the distribution of a sum of many independent, identically distributed random variables will tend toward a Gaussian distribution with a probability density function, which can be used to evaluate the initial quality of the tooling as well as at what point the distribution begins to degrade and tooling should be replaced.

Figure 10A:
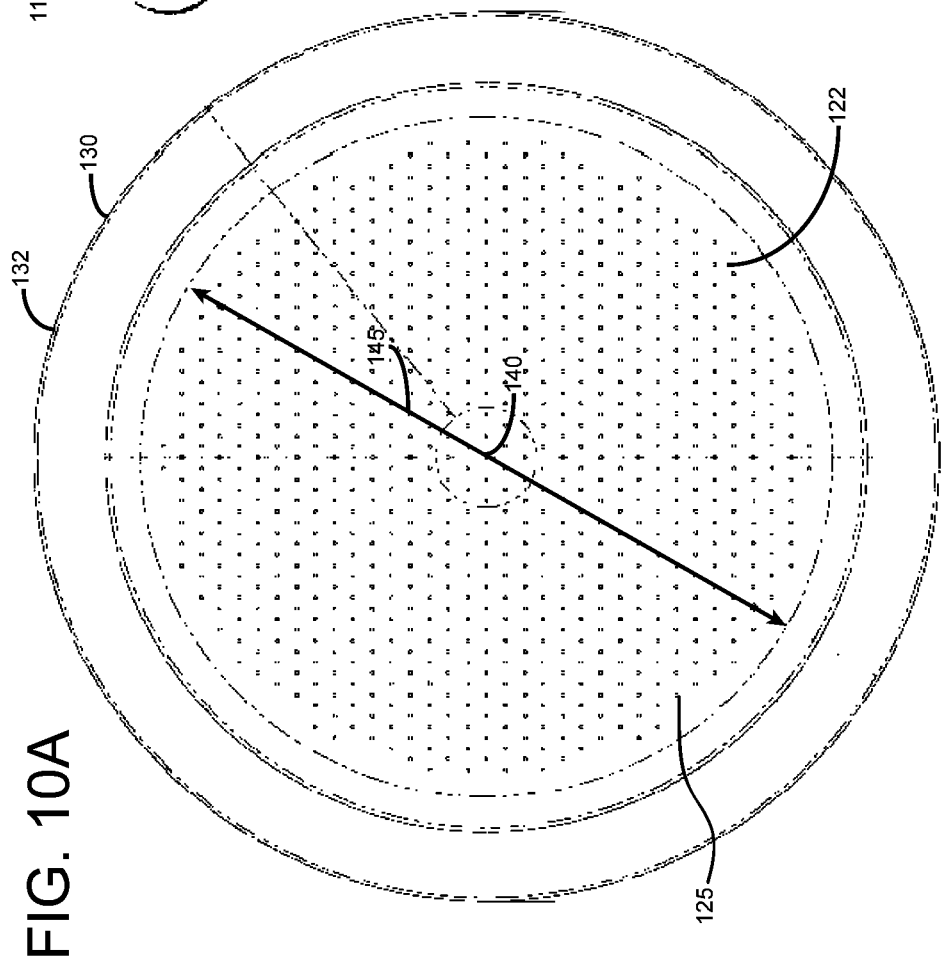
FIG. 10A is a bottom view of a coffee filter fabricated by micro-machining the aperture area of the filter.
Figure 10B:
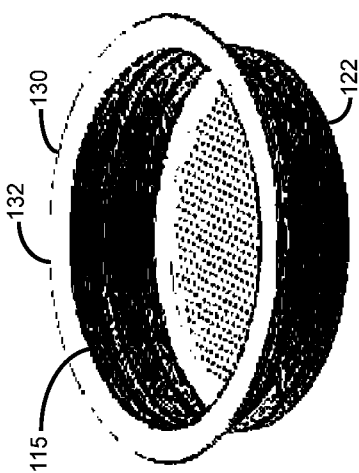
FIG. 10B is a perspective view of the filter of FIG. 10A.
Figure 10C:
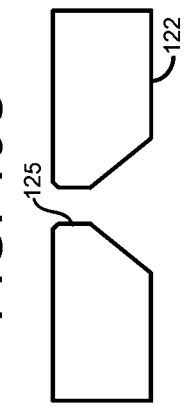
FIG. 10C is a representation of a cross section of an aperture of the filter of FIGS. 10A and 10B.

FIG. 10A is a top view of filter 115 looking down into the cup-shaped chamber that filter 115 forms. Holes such as hole 125 are visible in bottom 122 of filter 115. Filter 115 includes a rim 130 at top 132 and an array of holes 125 in bottom 122. Filter 115 includes a center 140 and an inner diameter 145. The portion of bottom surface 122 defined by inner diameter 145 is micro-machined to remove any burrs formed in holes 125. FIG. 10B shows a perspective view of filter 115. FIG. 100 shows a close-up cut-away view of a representative hole or aperture 125 in the micro-machined bottom 122 of filter 115. In order to maintain structural integrity, material thickness of filter 115 is chosen such that final thickness post machining is greater than or equal to 0.50 mm in one particular embodiment. In addition, the straight section of the top hole diameter 125 is kept constant for 0.10 mm to eliminate wear migration of hole size.

Figure 11:
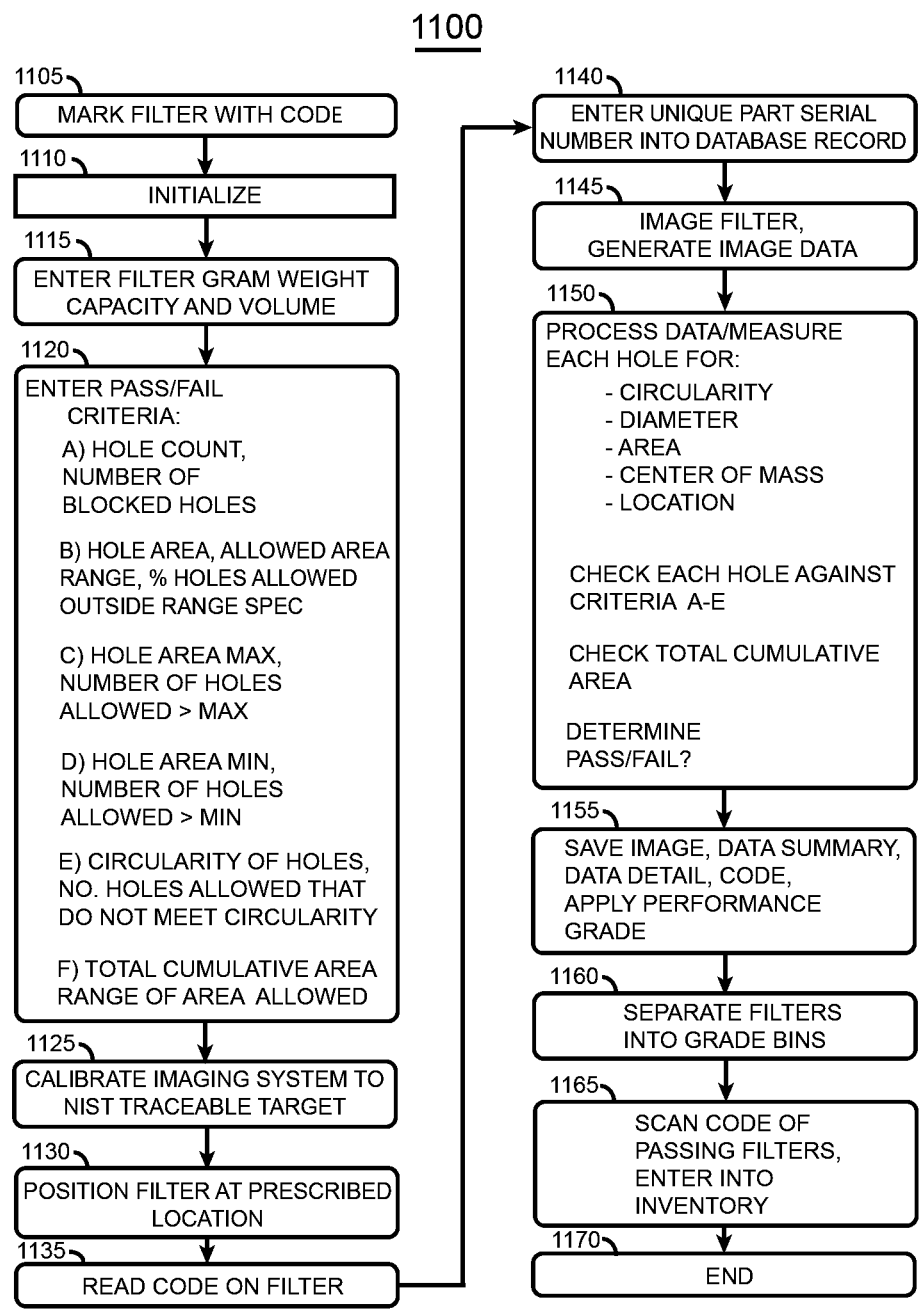
FIG. 11 is a flowchart that describes process flow in the disclosed liquid brewing filter qualification methodology.

FIG. 11 is a flowchart that depicts representative process flow in one embodiment of the filter qualification application 1100 of the disclosed filter qualifying system 100. FIG. 11 shows processes that filter evaluation application 1100 may implement. At some point in time before presenting coffee filter 115 for qualification, or presenting a batch of filters for qualification, all filters are marked with a unique code, as per block 1105. One code that may be used is an 18×18 2D code that is laser-drilled, or impact marked, into the metallic surface of coffee filter 115, such as shown in FIG. 1B as code 135. In one embodiment, the code is a non-human readable code to discourage counterfeiting. In one embodiment, the code is supplemented with a human readable performance grade for matching into multiple group espresso machines or Multiple Super Automatic machines, for example, to maintain a corporate brewing protocol for a corporate retail chain deployment. In one embodiment, the marking performed in block 1150 may be performed independent of filter evaluation application 1100. The human readable performance grade is desirably permanently fixed to filter 115, or alternatively, may be in an accompanying report. The performance grade relates to the qualities of the filter such as hole diameter and total free surface area for example. Filters with the same or matching performance grades will perform similarly under similar brewing conditions. By observing the human-readable performance grade on each filter, the barista or other operator will be provided with a reasonable expectation of how the filter will perform. More importantly, using filters with like performance grades allows the barista to achieve a consistent shot to shot capability in a multi-group coffee machine wherein filters are frequently swapped from group to group (i.e. from group head to group head). In prior non-graded filters, it is very likely that different filters will perform differently in a multi-group coffee machine leading to inconsistent brewing results and customer dissatisfaction. Using the same matching grade filter in all groups of the multi-group coffee machine allows the barista or other user to achieve consistent brewing performance from each group of the machine.

Filter qualification IHS 300 is initialized, as per block 1110. A user or other entity enters the coffee filter gram weight capacity and volume for the particular filter type into application 1100, as per block 1115. The user or other entity enters pass/fail criteria, namely the desired filter input criteria into application 1100, as per block 1120. More specifically, the user may enter the following input criteria: A) hole count, number of blocked holes; B) hole area, allowed hole area or diameter range, % holes allowed outside of range specification; C) hole area or diameter maximum, number of holes allowed>maximum (max); D) hole area or diameter minimum, number of holes allowed<minimum (min); E) circularity of holes, number of holes that do not meet circularity, may also be expressed in terms of acircularity; and F) total cumulative area range of area allowed.

The user calibrates the imaging system to an National Institute of Standards and Technology (NIST) traceable or equivalent target on optical bench 205, as per block 1125. The user positions filter 115 at the prescribed location on optical bench 205, as per block 1130. The filter may be positioned manually or, alternatively, via an automated feed system in a production environment. The user then reads the 2D code 135 on the particular filter under test, as per block 1135, using a 2D code reader. The unique serial number corresponding to the particular filter's unique code 135 is entered into a database record for storage, as per block 1140. The filter is imaged or photographed at high resolution via sub-pixel machine vision camera 225, as per block 1145. IHS 300 stores the resultant image data for that particular filter in non-volatile storage 345. IHS 300, under the control of filter qualification application 1100, processes the image data, as per block 1150, and measures each hole of the filter for circularity (acircularity), diameter, area, center of mass and location. IHS 100 checks each detected hole against criteria A-E, described above, to see if the particular filter meets those criteria. IHS 100 also checks the particular filter to determine if it meets the total cumulative area criteria of criteria F. IHS 100 makes a pass/fail decision based on whether or not the filter meets the above criteria.

IHS 100 saves the image, the data summary report of FIG. 9A, and the detailed data report formed by combining the information of FIGS. 9A, 9B and 9C, in a database in nonvolatile storage 345 or other storage location, as per block 1155. Many filters can be processed in rapid accurate fashion using the described method. The filter may be assigned grades, for example A, B and C, depending on how well they meet the predetermined filter criteria. Detailed or summary reports can be printed and attached to each filter. In an other embodiment, the 2D code can be read by a mobile device, and the detailed or summary report automatically downloaded and sent to be displayed on the mobile device. After evaluation, passed filters may be separated into grade bins, as per block 1160. The 2D code of those filters that pass qualification are scanned and stored, as per block 1165. The passing filters are entered into inventory with reports attached. Process flow terminates at end block 1170.

In an alternative embodiment, rather than separating the filters into separate grade bins at block 1160, the measured filters (PASS/FAIL) are accumulated or placed in a single bin. A filter randomly selected from this bin may be scanned using a remotely located reader, for example a fixed or hand held scanner at another location from the filter manufacturing site. Filter reading software, which is independent of the imaging software, looks up the filter report corresponding to a particular filter and displays the corresponding PASS/FAIL report. This filter report and filter reports associated with other respective filters may be stored in a server IHS (not shown). The user may immediately print the associated report, bag the filter part together with the respective report attached and place the bagged filter into inventory. If the particular filter exhibits a FAIL or other grade of status at this time, this particular filter may be separated from the PASS filters at this time. The particular filter may be classified as a lower grade filter or as a FAIL filter.

As will be appreciated by one skilled in the art, aspects of the disclosed filter qualification methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 375 embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 11 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 11 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 11 described above.

The flowchart of FIG. 11 illustrates the architecture, functionality, and operation of possible implementations of systems, methods and computer program products that perform network analysis in accordance with various embodiments of the present invention. In this regard, each block in the flowchart FIG. 11 may represent a module, segment, or portion of code, which comprises one or more executable instructions for implementing the specified logical function(s). It should also be noted that, in some alternative implementations, the functions noted in the block may occur out of the order noted in FIG. 11. For example, two blocks shown in succession may, in fact, be executed substantially concurrently, or the blocks may sometimes be executed in the reverse order, depending upon the functionality involved. It will also be noted that each block of FIG. 11 and combinations of blocks in the block diagrams and/or flowchart illustration, can be implemented by special purpose hardware-based systems that perform the specified functions or acts, or combinations of special purpose hardware and computer instructions.

B. Espresso Machine Apparatus and Coffee Filter

Figure 12A:
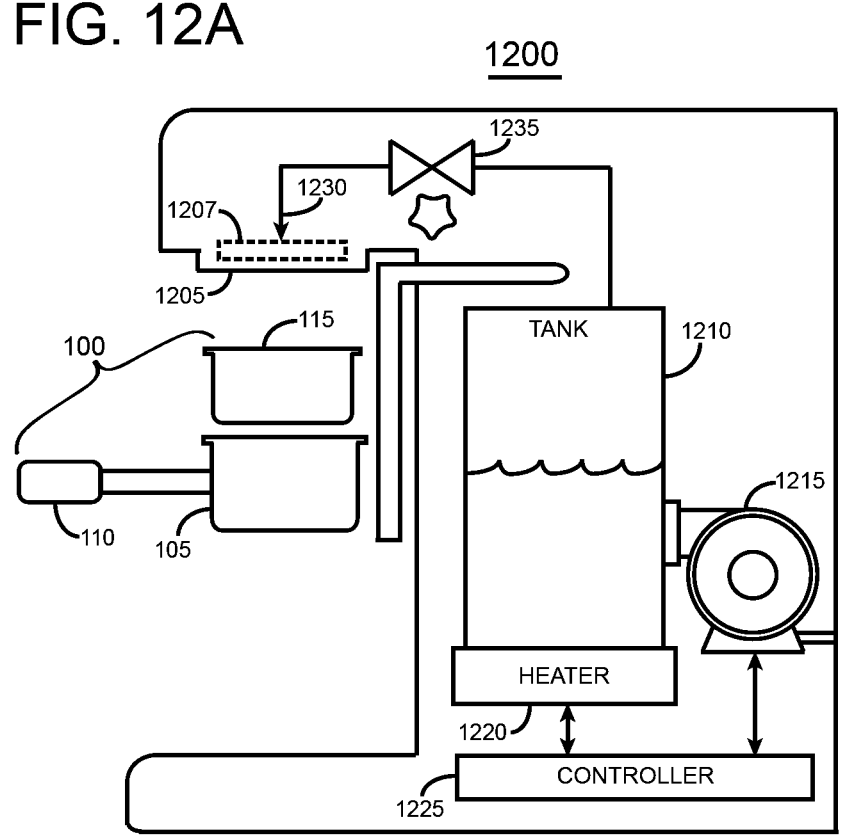
FIG. 12A is simplified side view/block diagram of the disclosed coffee machine.
Figure 12B:
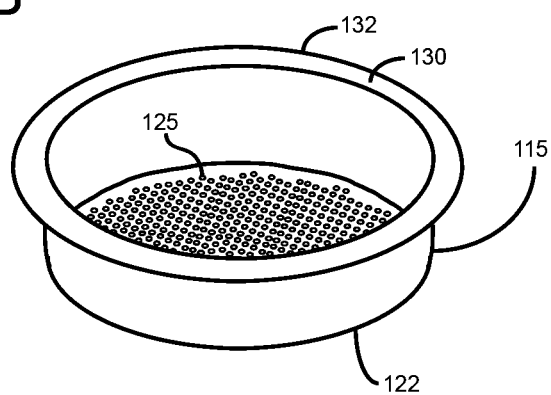
FIG. 12B is perspective view of the disclosed coffee filter.

FIG. 12A is a representation of a coffee machine 1200 including a portafilter assembly 100. Portafilter assembly 100 includes portafilter holder 105 of FIG. 1A and coffee filter 115 of FIGS. 1B and 12B. Coffee filter 115 may also be referred to as a coffee insert or filter basket. Coffee filter 115 includes exit holes 125 in the bottom 122 of filter 105. In one embodiment, coffee machine 1200 is suitable for preparing espresso coffee. Before discussing the coffee filter 115 of FIGS. 12A and 12B in more detail, some of the challenges and issues encountered in espresso brewing with an espresso machine are first discussed.

Coffee filter 115 fits within portafilter holder 105 to form portafilter assembly 100. Assembly 100 mounts to a head 1205 of machine 1200. Machine 1200 includes a reservoir 1210, such as a vessel or tank, for holding water. A pump 1215 couples to tank 1210 and a source of water (not shown) to supply water under pressure to tank 1210. A heater 1220 heats the water in tank 1210 to a predetermined temperature. A controller 1225 couples to heater 1220 and pump 1215 to control the temperature and pressure, respectively, of the water in tank 1210. In one embodiment, controller 1225 sets the temperature of the water to approximately 200° F. and the pressure of the water to approximately 130 PSI. Tank 1210 supplies heated, pressurized water to head 1205 in the flow direction indicated by arrow 1230. A control valve 1235 enables the user to turn on and off the flow of heated, pressurized water to head 1205 when the portafilter assembly 100 is mounted on head 1205. Portafilter assembly 100 mounts to head 1205 via flanges 124 and 126 (not visible in FIG. 12C, but visible in FIG. 1A) in bayonet mount fashion. FIG. 12A shows head 1205 as including a dispersion screen 1207 (depicted by a dashed rectangle). Dispersion screen 1207 dispenses heated, pressurized water to portafilter assembly 100 when a coffee-containing filter 115 is mounted in assembly 100 and assembly 100 is mounted to coffee machine 1200.

Figure 12C:
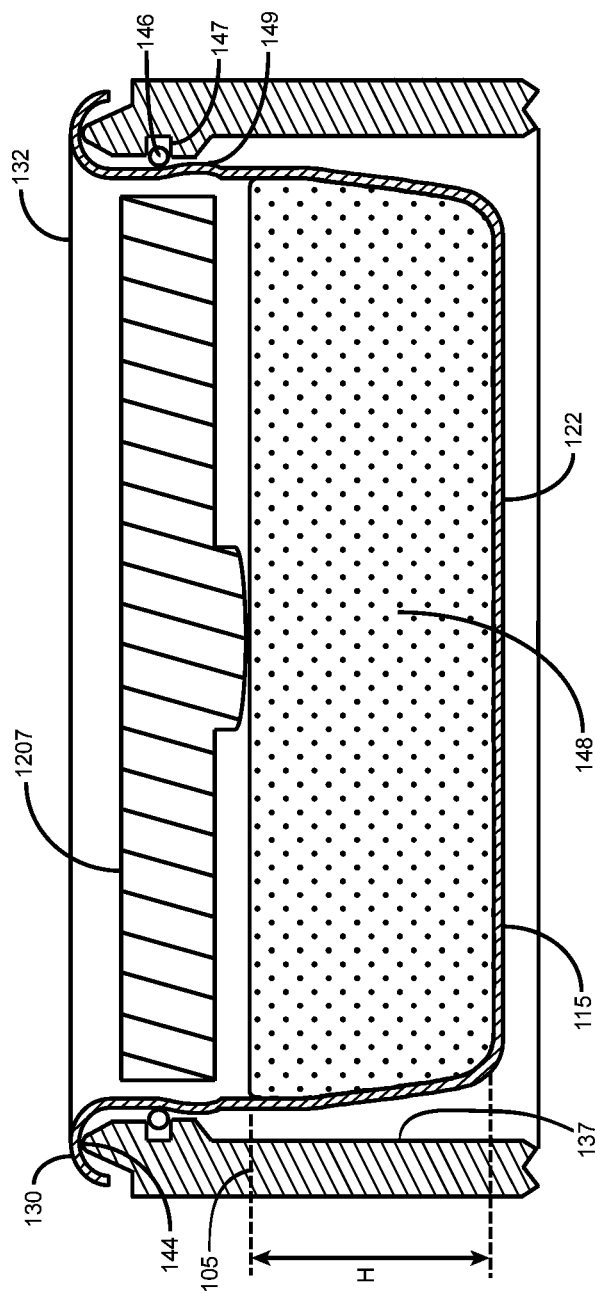
FIG. 12C is cross section of the disclosed coffee filter in a portafilter handle.

FIG. 12C shows a cross-section of portafilter assembly 100 when coffee filter 115 is retained in portafilter holder 105 and portafilter assembly 100 is mounted to head 1205 of machine 1200. The dispersion screen 1207 of head 1205 is visible in FIG. 12C. In this view, dispersion screen 1207 is shown in cross-section. Portafilter holder 105 includes a substantially cylindrical cavity 137 in which coffee filter 115 is situated. Filter 115 includes a rounded annular lip or rim 130 at the top 132 of the filter 115. The inside of the rounded annular rim 130 of filter 115 rests on an annular ridge 144 at the top 132 of assembly 100. The top (outside) of the annular rim 130 is pressed into an annular gasket (not shown) located adjacent to dispersion screen 1207 which serves to seal the filter at the dispersion screen where heated, pressurized water exits during extraction. A retaining spring 146 is situated within a groove or channel 147 in the inner side wall of cylinder 137 of portafilter holder 105. Retaining spring 146 contacts filter 115 adjacent an annular retaining ridge 149 to hold the filter in place in portafilter holder 105. FIG. 12C shows portafilter assembly 100 loaded with a dose of coffee 148 after tamping by the user. Coffee 148 is depicted below head 1205 with appropriate head-room between dispersion screen 1207 and coffee 148. The height of coffee 148 within coffee filter 115 is indicated as height, H, in FIG. 12C. Dispersion screen 1207 of head 1205 includes holes (not shown) through which heated, pressurized water flows to brew coffee 148 on command of the user. For simplicity, filter exit holes 125 in the bottom 122 of filter 115 are not illustrated FIG. 12C. When pulling a shot of espresso, it is through the exit holes 125 of filter 115 seen in FIG. 12B that brewed coffee flows from filter 115 into a waiting cup or container (not shown).

The basic chemistry of espresso that machine 1200 brews is similar to that of coffee, extraction-wise, albeit at a much higher concentration. The total brew solids include both dissolved and non-dissolved solids in espresso. Strength, in percent TDS (total dissolved solids, or concentration) is determined by filtering the non-dissolved solids, then measuring concentration by refractometry or by dehydration oven. When the dose and beverage weights are known, extraction yield can be computed and charted. In a proper extraction at a given strength, extraction yield is an important attribute to track regarding taste defects. Like taste defects that are useful to describe over-extracted or under-extracted coffee, similar attributes apply to espresso, but these attributes are much more pronounced at the higher (e.g. 10×) concentration of espresso.

The non-dissolved solids are ~70% cellulose by weight, and are not soluble in water. The non-dissolved solids should be excluded from the TDS measurement of espresso because they do not participate in the extraction. In one embodiment, using disclosed filter 115 may result in non-dissolved solids typically in the range of 4-6% of the total brew solids. However, in some poorly fabricated filters, the non-dissolved solids may measure 9-13%, producing an undesirable vegetal, chalky beverage. Within that sediment are excessive amounts of the diterpenes cafestol and kahweol, known to increase production of serum cholesterol levels. For these and other reasons it is desirable to minimize these non-dissolved solids. It has been found that in some instances, using the disclosed filter 115 may reduce these non-dissolved solids by approximately half.

Espresso extraction can be thought of as a method that accelerates the brewing process, using the catalyst of pressure combined with a much finer grade of grind of espresso coffee than regular coffee. By using the coffee refractometer described in patent application, application Ser. No. 12/247,232 entitled "Coffee Refractometer Method and Apparatus", together with the universal coffee brewing chart methodology described in patent application, application Ser. No. 12/247,231 entitled "Method and Apparatus for Brewing Coffee Via Universal Coffee Brewing Chart Generation", a user may accurately measure extraction percent (solubles yield) and concentration (total dissolved solids—TDS %) to better understand exactly what has been brewed. This enables the user to associate those measurements with the user's primary taste preferences as perceived by the user, and then to make corrective actions, if needed. The teachings of application Ser. Nos. 12/247,232 and 12/247,231 are incorporated herein by reference in their entireties and are assigned to the same assignee as the subject patent application.

Figure 13:
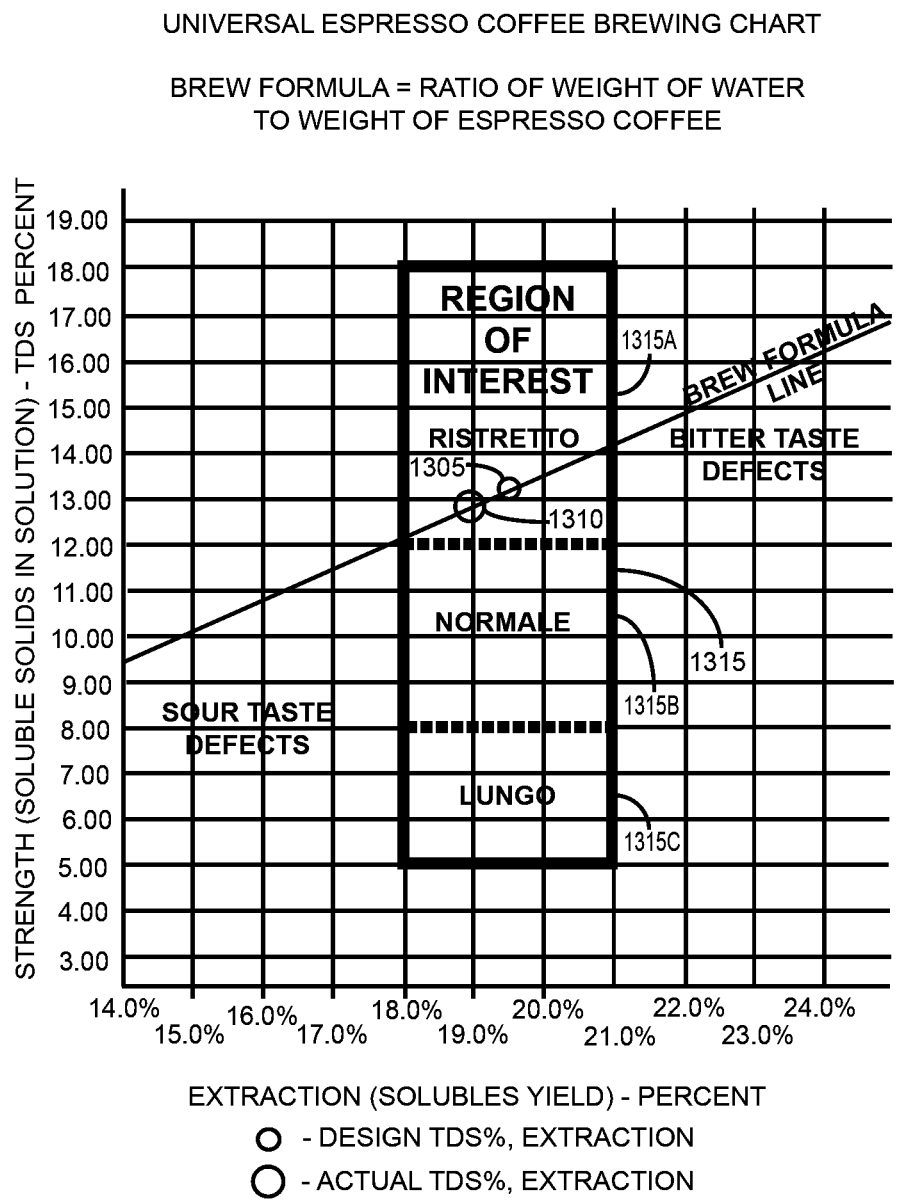
FIG. 13 is universal espresso coffee brewing chart.

More particularly, the user may design an espresso coffee with a particular target extraction percent and target total dissolved solids (TDS) percent (strength) such as shown at 1305 on the universal espresso coffee brewing chart of FIG. 13. After brewing, the user may employ the apparatus and methodologies of patent application Ser. Nos. 12/247,231 and 12/247,232 to use the disclosed refractometer and chart methodology to determine the actual extraction % and TDS % achieved, as seen at 1310 in the chart of FIG. 13. Best results are achieved within region of interest 1315. Outside of this desirable region of interest 1315, the resultant espresso may exhibit sour taste defects or bitter taste defects as indicated at the lower left and upper right, respectively, of the chart. In FIG. 13, dashed lines separate region of interest 1315 into a "ristretto" (short shot) region 1315A, a "normale" (normal) region 1315B and a "lungo" (long shot) region 1315C. By using these techniques, the user may repeat those extractions that the user prefers, wherever they might fall on the universal brewing chart of FIG. 13.

Machine 1200 is capable of providing consistent temperature, pressure and flow of water into portafilter assembly 100. In machine 1200, there are three other important factors that significantly affect extraction flow rates (i.e., contact time and extraction yields), namely: coffee particle size, coffee depth and total cumulative hole open area in filter 115. There is a relationship between these three attributes that should be harmonized for each filter capacity. A filter with correct hole size and total open area designed for 21-22 grams of coffee will not and should not be expected to extract normally when filled to only 14-15 grams. The filter will pour too fast, causing the barista or other user to try to throttle flow by grinding the coffee finer. In this scenario, the holes in the filter and total open area provided by these holes are sized for a bed depth of 21 grams, so grinding the coffee finer without also reducing the hole sizes will in effect de-tune the filter. The non-dissolved brew solids component will spike, and the user will over-extract the coffee, providing both a bitter and chalky final beverage.

Similarly, if a filter has a large quantity of holes that are too large for its design capacity, then the barista or other user is forced to grind the coffee finer to throttle flow, even when filled to normal capacity. This will inevitably produce a similarly over-extracted, sediment-loaded and unacceptable beverage. If a filter has a substantial deficit (too little open area), the barista is forced to grind the coffee too coarse, causing faster pours and reduced particle surface area to extract from, and results will taste sour and will measure as being under-extracted.

It has been found that manufacturing techniques for many espresso coffee filters are still relatively crude. Many filters exhibit wide variations in the diameters of the holes in the filter and the total cumulative hole area through which the coffee liquid may flow. This may result in erratic shot-to-shop consistency. Moreover, many filters include holes that are partially or completely occluded. The total cumulative hole area and relative size and distribution of open holes may vary dramatically from filter to filter of the same design. These irregularities are readily observed in the failed coffee filters of FIGS. 4A, 4B and 4C and the filter image of FIG. 8A, as well as the histograms of FIGS. 5A and 5B, already discussed above. Poorly fabricated filters, with many blocked and partially occluded holes exhibit demonstrably slower flow, when using the same grind setting than the disclosed filter 115 that exhibits uniform hole size and consistent total cumulative hole area from filter to filter. A filter with blocked and/or occluded holes requires a significant step towards a more coarse grind in an attempt to obtain normal flow and shot times. However, the shots made in this manner taste sour and measure as being significantly under-extracted, as compared to the disclosed filter 115.

One embodiment of the disclosed filter structure and filter fabrication methodology provides certainty with respect to coffee filter hole size, hole circularity and uniformity of total cumulative hole area from filter to filter in a manner not previously achieved in modern filter designs. In one embodiment, filter 115 is fabricated of stainless steel material in such a manner as to reduce metal fatigue stress cycling experienced by other filters as they repetitively flex under the on and off pressure each time the espresso machine pump is turned on and off to extract a single shot.

The above-described fatigue mechanism is now discussed in more detail. The fatigue mechanism involves repetitive flexing of the bottom of the filter in which the holes are fabricated. When the pump reaches nine BARs (approximately 130 PSI) and flow is initially restricted during a shot, the bottom of the filter is pushed out from the considerable force of the pressure. A typical 59 mm diameter filter experiences 550 pounds (250 Kgs) of force when the pump is at full pressure. This causes the bottom of the filter to bend down, with the fulcrum at the corner where the bottom joins the side wall of the filter. When the pump is turned off, the bottom of the filter returns to its initial home position. If the filter material is thinned too much in the hole forming process, this may cause the filter to fail prematurely in heavy commercial use.

In one embodiment of the disclosed filter fabrication methodology, a cup-shaped member is formed from a malleable metallic material such as stainless steel and exit regions with respective holes are subsequently formed in the flat bottom of the cup-shaped member in accordance with the teachings herein. In another embodiment of the disclosed filter fabrication methodology, the exit regions with respective holes are formed in a flat sheet of malleable metallic material such as stainless steel and subsequently an appropriate press or other machine forms the sheet into a cup-shaped member. These two embodiments are described in the order presented above.

After the disclosed coffee filter 115 is fabricated using the methodology described herein, the disclosed liquid brewing filter qualification system 200 of FIG. 2 is useful in verifying that each hole in filter 115 is substantially circular and that the total cumulative hole area of the filter meets specifications.

Figure 14A:
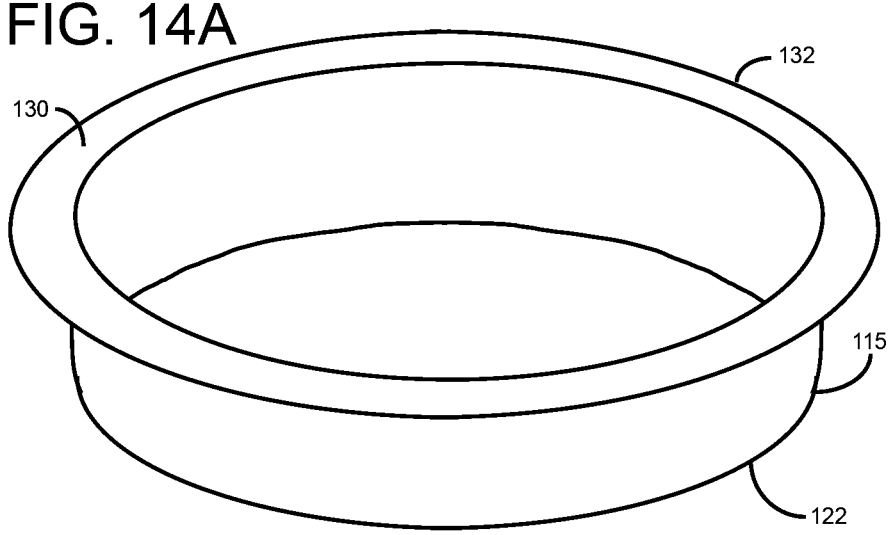
FIG. 14A-14C are views of the cup-shaped member used to form the disclosed coffee filter in one embodiment of the disclosed filter fabrication methodology. In another embodiment, an alternative filter fabrication method is disclosed starting with a substantially flat metallic member.
Figure 14B:
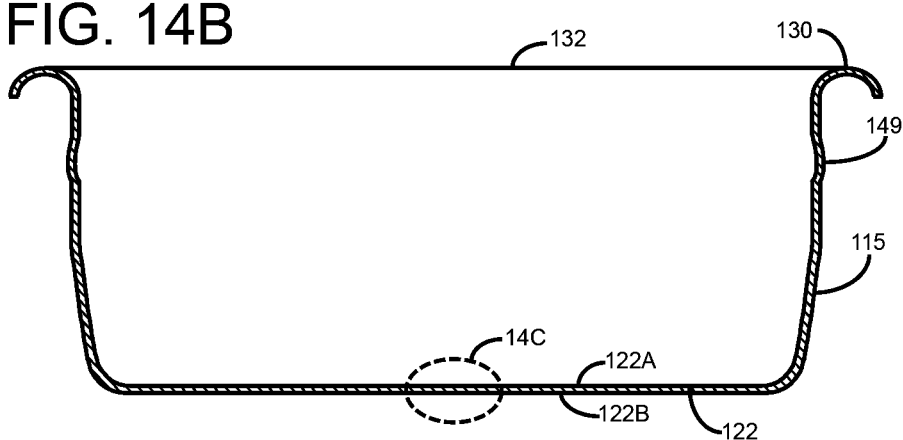
Figure 14C:
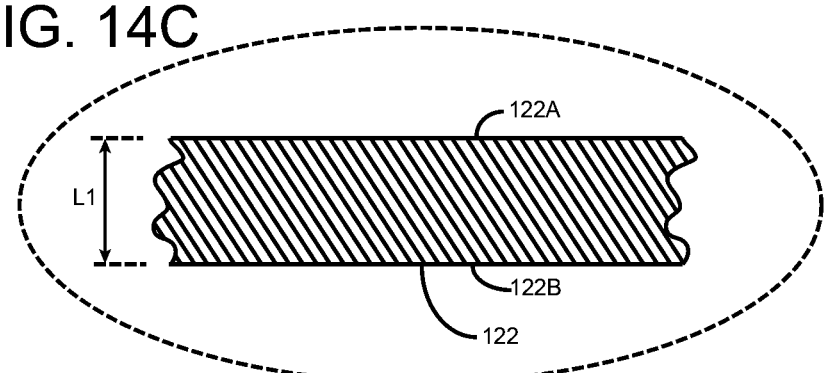

In one embodiment, filter 115 is formed into a cup-like geometry as shown in FIG. 14A. FIG. 14A shows filter 115 prior to fabrication of holes in the bottom 122 of filter 115. While conventional filters typically employ 0.5 mm thick stainless steel, one embodiment of the disclosed filter 115 employs 0.6 mm thick stainless steel. This thickness of stainless steel is substantially more difficult to form and work, and requires a greater degree of precision with respect to dimensions, but provides the additional strength and resistance to premature repetitive fatigue failure, because even after micro-machining, its final thickness is typically 0.55 mm, or greater than the normal thickness of material used prior to micro-machining. In one embodiment, this filter material is approximately 20% thicker and heavier than the material used in conventional filters. Filter 115 is dimensioned precisely to fit inside portafilter head 1205. FIG. 14B is a cross section of FIG. 14A. FIG. 14C is a close-up view of a portion 14C of filter 115 of FIG. 14B at the bottom 122 thereof. FIG. 14C shows bottom 122 of filter 115 prior to forming holes in filter 115 by using the disclosed methodology. FIG. 14C shows the thickness of filter 115 being L1, namely 0.6 mm of a metal such as stainless steel in this embodiment. In one embodiment, the metal from which filter 115 is formed exhibits a thickness, L1, of 0.6 mm plus or minus approximately 0.05 mm. Filter bottom 122 includes opposed major surfaces 122A and 122B wherein surface 122A is internal to filter 115 and surface 122B faces outward.

Figure 15A:
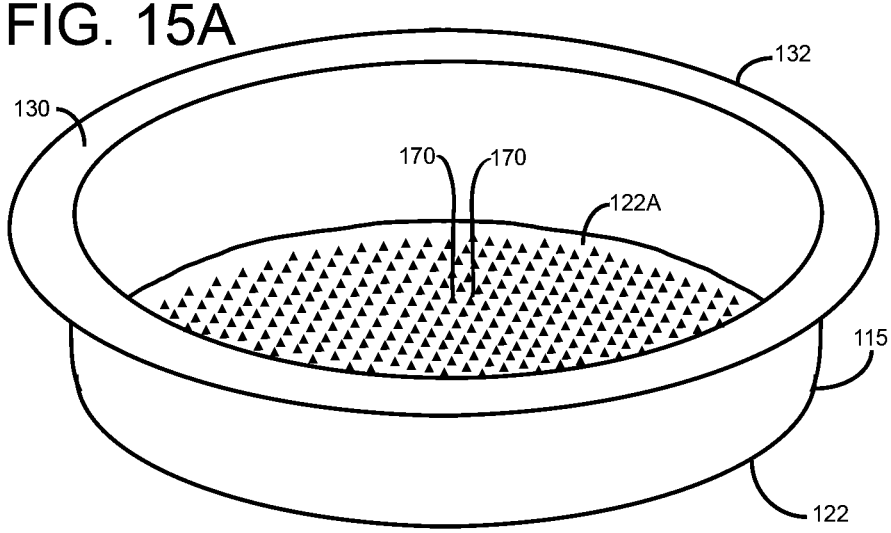
FIG. 15A-15C are views of the member of FIG. 14A-14C with indentations formed by stamping at future hole locations.
Figure 15B:
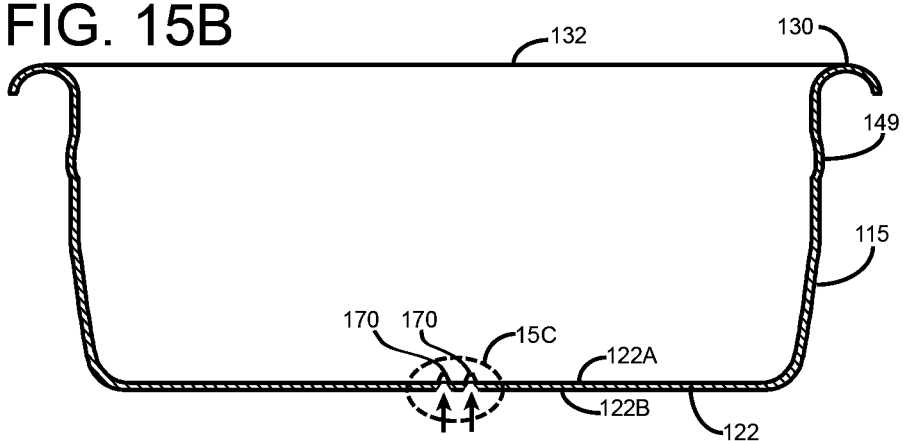
Figure 15C:
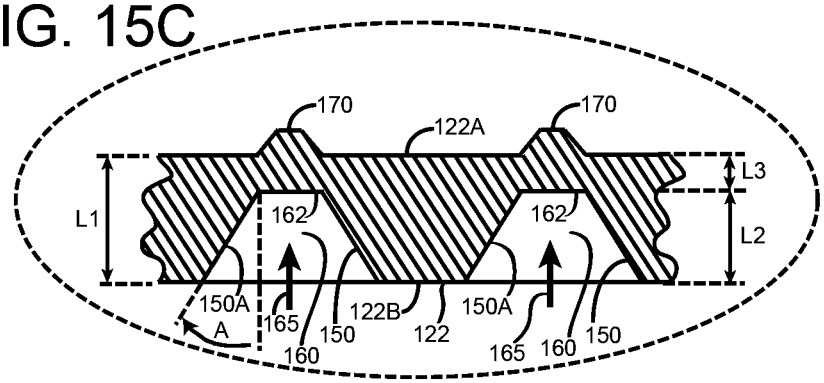

FIGS. 15A-C show the beginning of one methodology process for forming holes in filter 115 that exhibits thickened metallic material such as stainless steel. In this particular example, filter 115 includes 715 holes in its bottom 122 to provide a total cumulative open hole area of 60 mm$^2$ wherein each hole exhibits a diameter of approximately 0.3 mm. For discussion purposes, the fabrication of two representative holes is illustrated and discussed, although the same technique and methodology is applicable to forming all the holes in bottom 122 of filter 115. FIG. 15B is a cross section of the perspective view of filter 115 of FIG. 15A.

FIG. 15C shows filter bottom 122 after two indentations 150 are stamped in bottom surface 122B by a stamping device (not shown). These indentations 150 will provide espresso exit regions for each hole, as discussed in more detail below. The stamping device includes one pin for each of the holes to be formed in the bottom 122 of filter 115, namely 715 holes in this particular example. Each pin is shaped to form a pyramid-shaped or conical-shaped indentation 150 in the bottom 122 of filter 115. Indentation 150 provides an exit region 160 through which espresso liquid will later flow. More particularly, each pin of the stamping device is shaped to form an indentation 150 that reaches to a depth, L2, into bottom surface 122B of filter as shown in FIG. 15C. In one embodiment, depth L2 may be approximately 0.5 mm when the initial filter thickness before hole formation, L1, is approximately 0.6 mm. The distance, L3, between the innermost portion or vertex 162 of indentation 150 and filter surface 122A is approximately 0.1 mm when the filter thickness, L1, is approximately 0.6 mm. In this particular embodiment, the pins on the stamping device are shaped to form each indentation 150 with a tapered wall 150A that exhibits an angle A of approximately 42 degrees with respect to the vertical, as shown in FIG. 15C. Angle A may be a value somewhat larger or smaller than 42 degrees as long as angle A is a wide angle sufficiently large to prevent or ameliorate clogging of holes should a coffee particle flow start to through a hole. In one embodiment, tapered walls 150A may exhibit an angle, A, within the range of approximately 30 degrees to approximately 60 degrees from a normal to the major surface 1222A of the bottom 122. Arrows 165 correspond to the direction at which pins on the stamping tool contact filter bottom 122 surface 122B to form tapered exit regions 160 therein as part of forming holes in filter bottom 122. Each indentation 150 and corresponding exit region 160 includes a vertex 162 where the indentation narrows as shown in FIG. 15C. The stamping of bottom 122 of filter 115 forms a raised portion or bump 170 in filter surface 122A above each indentation 150.

Figure 16A:
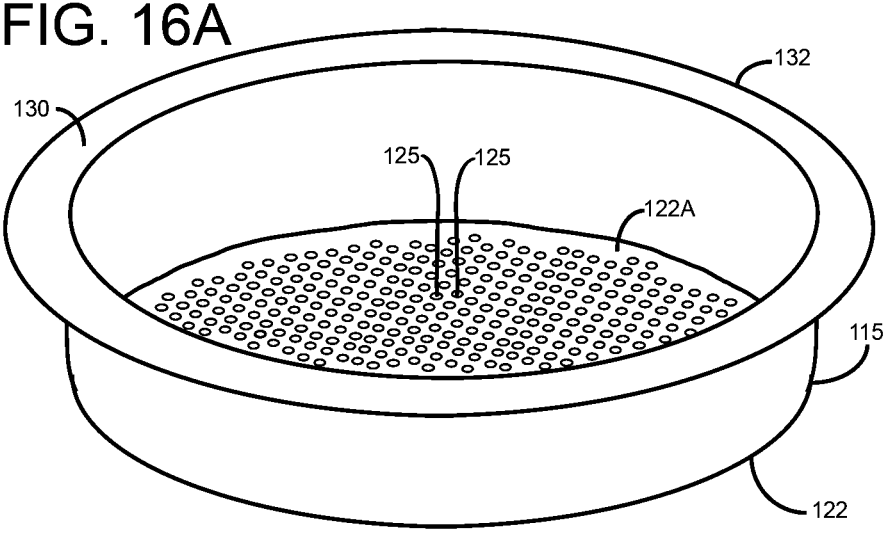
FIG. 16A-16C are views of the member of FIG. 15A-15C with holes formed in the hole uniformity enhancement region at each indentation.
Figure 16B:
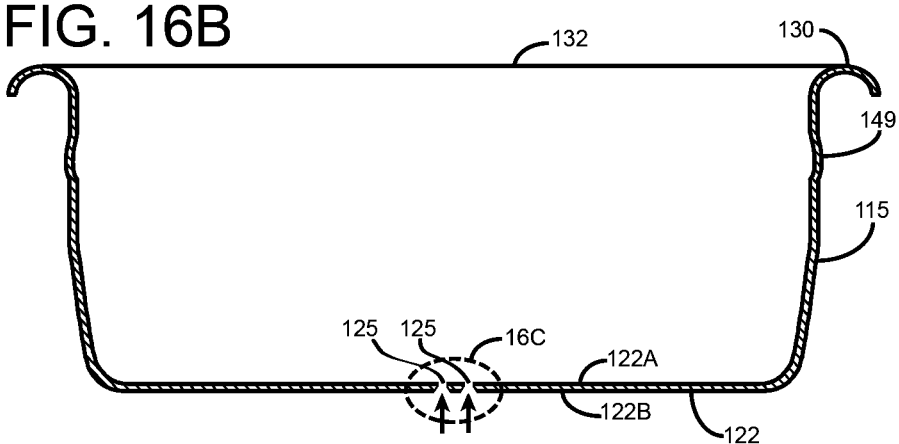
Figure 16C:
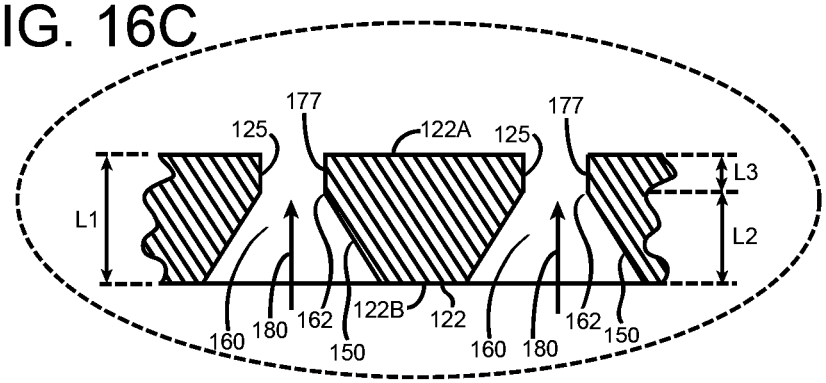

FIG. 16A-C shows the forming of a hole 125 at the location of each indentation 150 and corresponding bump 170. To form holes 125, in one embodiment, the vertex 162 of each indentation 150 is vertically drilled out from the bottom side 122B of filter 115 all the way through the bump 170 on opposed surface 122B. A laser drill may be employed for this vertical drilling operation, as well as for the tapered operations. This removes most of bump 170 from bottom surface 122A. Using indentations 150 as a guide, each indentation 150 is drilled perpendicular to the plane of bottom 122 in the direction of arrows 180 to form apertures or holes 125. In one embodiment, the diameter of hole 125 is 0.3 mm. Each hole 125 extends through a hole uniformity enhancement region 177 that exhibits thickness, L3, that is sufficiently large to resist the transformation of holes 125 into irregular geometry holes when surface 122A is micro-machined in the manner discussed below. In one embodiment, uniformity refers to geometric uniformity of the holes 125. For example, a circular hole is geometrically uniform whereas an irregularly shaped hole such as an occluded hole does not exhibit geometry uniformity. In one embodiment, laser drilling or mechanical drilling may be employed to form holes 125 in filter 115 from the bottom side 122B of filter 115. Holes 125 include a vertical side wall 177A (shown below in FIG. 17D) that is normal to bottom surface 122A.

Figure 17A:
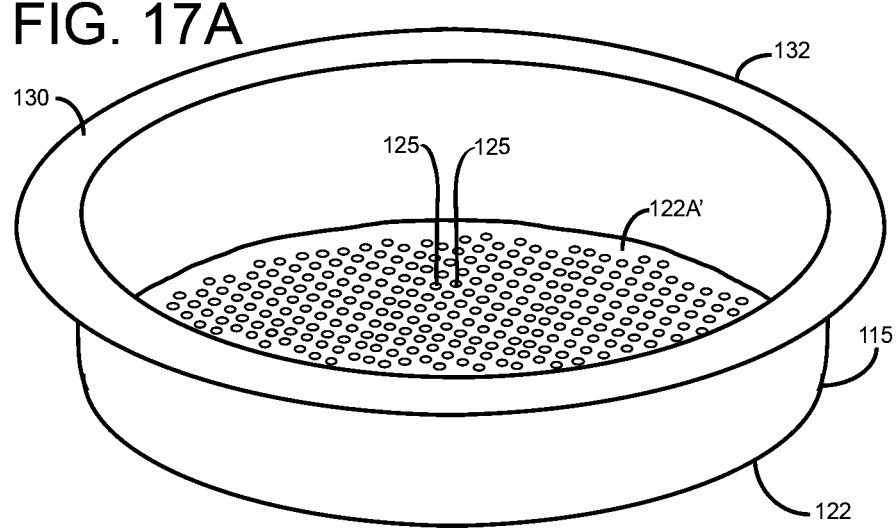
FIG. 17A-17C are views of the member of FIG. 16A-16C after micro-machining to finish the disclosed coffee filter, and FIG. 17 D shows a close-up view of a representative hole of the disclosed finished coffee filter of FIG. 17C.
Figure 17B:
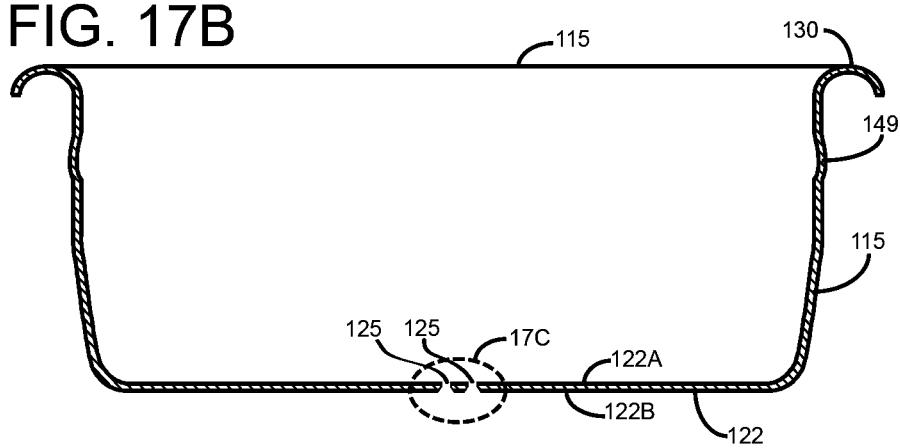
Figure 17C:
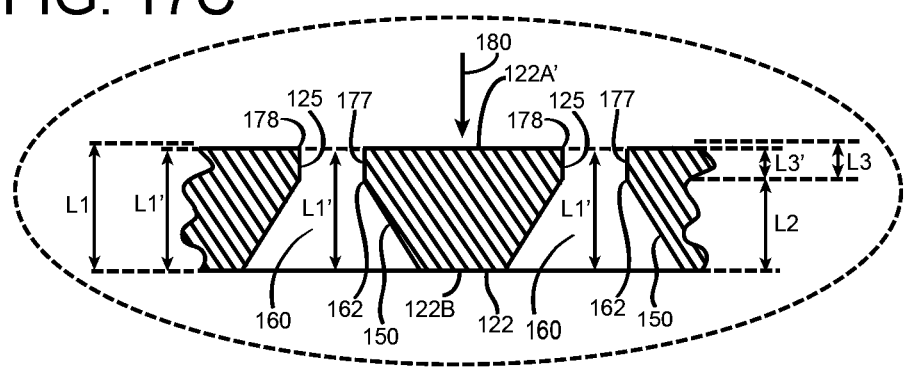

FIG. 17A-C shows filter 115 after surface 122A is micro-machined to form micro-machined surface 122A'. Micro-machining refers to machining or removing a minute amount of material from a metallic object wherein the thickness of the removed material is in the range of approximately 100 microns (0.1 mm) to less than one micron. In one embodiment wherein the initial thickness of filter 115 exhibits an L1 value equal to 0.6 mm, surface 122A is micro-machined down in the direction of arrow 180 by removing a very small amount of material, such as approximately 30-70 microns (0.03-0.07 mm) to form filter 115 with micro-machined surface 122A'. The resultant final thickness L1 of filter 115 after removing material from surface 122A is approximately 0.53-0.57 mm When this micro-machining process is used, and specifications are followed to remove material from surface 122A in this manner, the vertical dimension L3 of hole uniformity enhancement region 177 is maintained and assures that the resultant machined holes 125 remain circular, and that the final thickness of the material is sufficient to assure adequate service life eliminating premature fatigue stress failures. To make this hole circularity preservation feature possible, the thickness of hole uniformity enhancement region 177 prevents the micro-machining action from reaching down into exit regions 160 and causing irregular, non-circular holes. It is noted that the vertical dimension L3 is the height of hole uniformity enhancement region 177 prior to machining. The vertical dimension of hole uniformity enhancement region 177 after machining is L3', namely 0.15 mm in this particular embodiment. L3' may have a value within the range of approximately 0.1-approximately 0.17 mm. In one embodiment, the value of L3' must never go to zero (0). Without the thickness provided by hole uniformity enhancement region 177, when bottom surface 122A is machined down, irregular noncircular holes might otherwise be formed should the machining action reach into indentations 150 of exit regions 160.

Figure 17D:
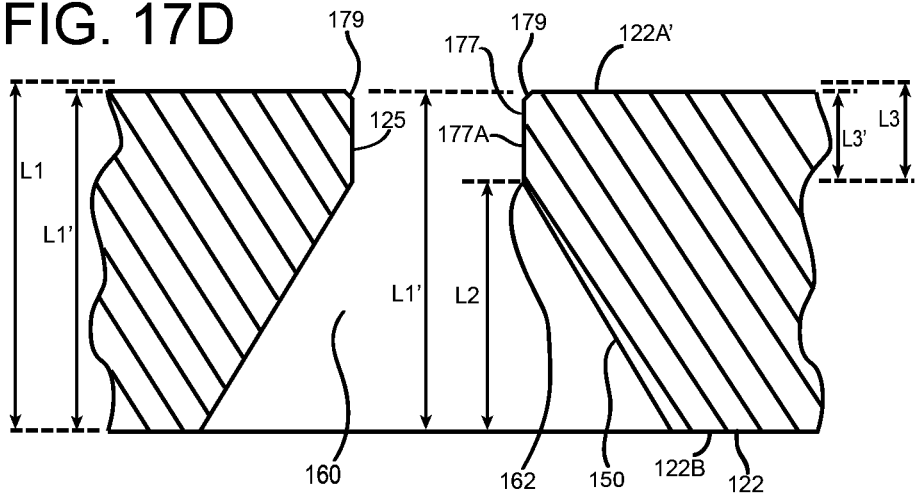
FIG. 17E is a bottom view of a pyramidal-shaped indentation in the bottom of the disclosed coffee filter.
FIG. 17F is a bottom view of a conically-shaped indentation in the bottom of the disclosed coffee filter.

FIG. 17D is a close-up view of a portion of filter bottom 122 including a representative hole 125. In this particular embodiment, drilling from vertex 162 up through the surface 122A of filter bottom 122 removes most of the bump 170 previously at the hole location. Micro-machining of filter bottom surface 122A removes remaining material at the hole location but some metallic material may still be left around the corner 178 (see FIG. 17C) where hole 125 meets filter micro-machined surface 122A'. A chamfering tool forms a minute chamfer 179 at the corner of each hole 125 as shown in FIG. 17D to remove any excess metallic material remaining at hole 125 at corner 178. Chamfer 179 is sufficiently large to deburr hole 125 at corner 178.

A number of different methods may be used to fabricate filter 125 to a geometry consistent with that taught by FIG. 17A-17F and the accompanying description. Table 1 below summarizes representative values for some of the dimensions of the preferred embodiment of filter 125. Tables 2-3 below summarize representative values for some of the dimensions of other embodiments of filter 125.

TABLE 1

| Dimension | Minimum (mm) | Sample Value (mm) | Maximum (mm) |
| --- | --- | --- | --- |
| L1 |  | 0.60 |  |
| L1' | 0.50 | 0.55 | 0.57 |
| L2 | 0.35 | 0.40 | 0.45 |
| L3 |  | 0.20 |  |
| L3' | 0.10 | 0.15 | 0.17 |

TABLE 2

| Dimension | Minimum (mm) | Sample Value (mm) | Maximum (mm) |
| --- | --- | --- | --- |
| L1 |  | 0.50 |  |
| L1' | 0.43 | 0.45 | 0.47 |
| L2 | 0.25 | 0.30 | 0.25 |
| L3 |  | 0.10 |  |
| L3' | 0.03 | 0.05 | 0.07 |

TABLE 3

| Dimension | Minimum (mm) | Sample Value (mm) | Maximum (mm) |
| --- | --- | --- | --- |
| L1 |  | 0.70 |  |
| L1' | 0.65 | 0.65 | 0.67 |
| L2 | 0.40 | 0.50 | 0.55 |
| L3 |  | 0.20 |  |
| L3' | 0.10 | 0.15 | 0.17 |

Figure 17E:
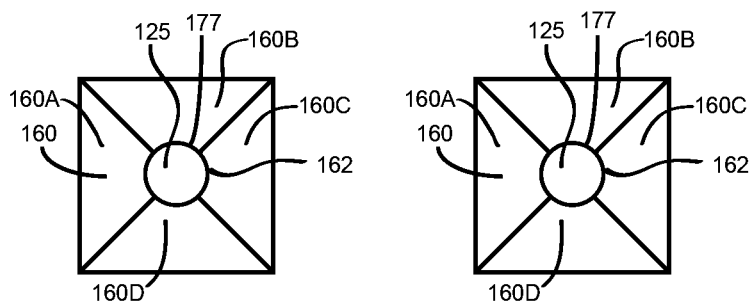
Figure 17F:
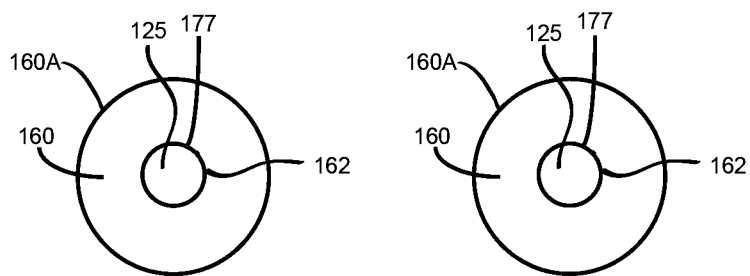

FIG. 17E shows an embodiment of filter 115 wherein two holes 125 are depicted for simplicity. In this particular embodiment, exit region 160 exhibits a pyramidal geometry that includes four (4) sides 160A, 160B, 160C and 160D. Each of these 4 sides exhibits an angle A of approximately 42 degrees with respect to the vertical as depicted in FIG. 15. Other embodiments are possible with fewer or more sides than shown in FIG. 17D. For example, exit regions may exhibit a 3 sided geometry. Exit region 160 may also exhibit 4, 5 or more sides. Geometries other than pyramidal may also be employed. For example, exit region 160 may exhibit a conical geometry as shown in FIG. 17F. In this embodiment, side 160A represents the conical side surface that extends around all of conical exit region 160.

It is noted that when fabricating hole uniformity enhancement region 177 with holes 125 and adjusting its vertical dimension L3 by micro-machining, the dimension L1' is not perfectly uniform across surface 122A because no machining process is perfect. The L3 dimension of hole uniformity enhancement region assures the geometry integrity of hole 125. Thus, it is permissible for the vertical dimension L1' to vary somewhat as long as, after micro-machining, L3' does not go to zero. In other words, L3' should be greater than zero (0) and is desirably 0.05-0.12 mm (120 microns) in one embodiment. Hole uniformity enhancement region 177 with hole side walls 177A assures that tapered indentation 150 does not extend all of the way to surface 122A of bottom 122. In one embodiment, L3 may reduced by as little as approximately 30 microns and as much as approximately 100 microns by micro-machining to form L3', the sidewall 177A dimension after micro-machining. In one embodiment, this sidewall 177A dimension L3' after micro-machining may be within the range of approximately 0.05 mm to 0.12 mm.

As noted above, filter 115 may be fabricated to be consistent with the above-described and depicted geometry by a number of different methods. In one embodiment, described immediately above, the method may start with an already formed cup-shaped member into which holes are formed from the bottom. In another embodiment, the holes may be formed from the top. In yet another embodiment, the method may start with a flat metallic sheet. The holes may be formed in the sheet from the bottom or from the top thereof. After hole formation, the sheet may be formed into a cup-shaped member. These four embodiments are discussed in more detail below.

Four flowcharts, namely the flowcharts of FIGS. 18A, 18B, 18C and 18D will describe process steps for four different methods of forming filter 115 to meet the dimensions of FIGS. 17C and 17D.

Figure 18A:
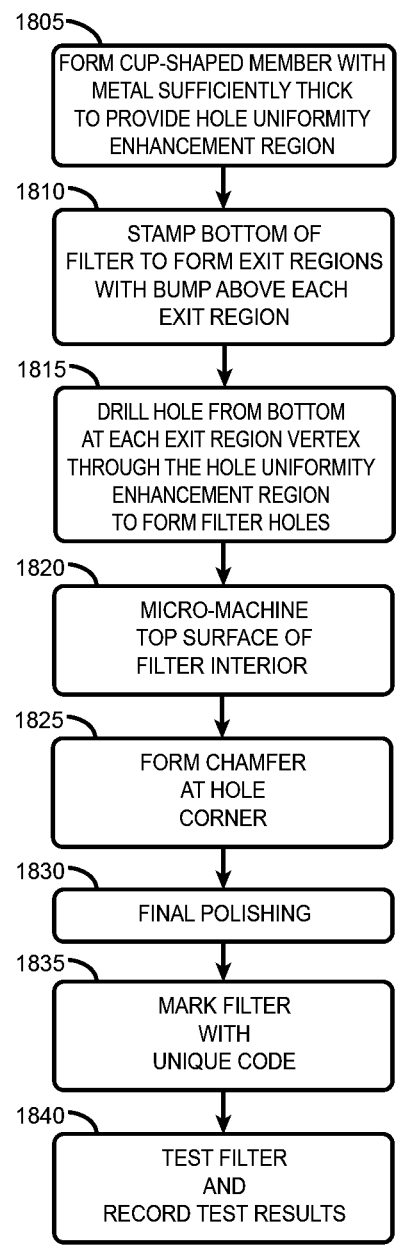
FIG. 18A-18D are flowcharts that depict process flow in several embodiments of the disclosed methodology for fabricating the disclosed coffee filter.

FIG. 18A is a flowchart that depicts process flow in an embodiment of the disclosed methodology that starts with a cup-shaped metallic member and forms holes in a hole uniformity enhancement region of the member from the bottom side of the member. More specifically, process flow commences with forming a cup-shaped metallic member that is sufficiently thick to provide a hole uniformity enhancement region 177, as per block 1805 and as described above. Such a cup-shaped member is shown in FIGS. 14A-14C. The bottom side surface 122B of the cup-shaped member is stamped to form indentations 150 that act as exit regions 160, as per block 1810 and as described above. This stamping action forms a bump 170 above each indentation 150. In one embodiment, a hole 125 is drilled from the bottom of the cup-shaped member at each exit region vertex 162 through the hole uniformity enhancement region 177 to form the filter holes 125, as per block 1815. Laser drilling is an example of one type of drilling that may be employed to form filter holes 125. This drilling action removes most of each bump 170. The top surface 122A of the filter interior is micro-machined to form micro-machined surface 122A', as per block 1820. This micro-machining action shaves off a minute portion of top surface 122A of the filter bottom 122 to form micro-machined surface 122A'. The corner of each hole is chamfered where each hole meets top surface 122A' to form chamfers 179, as per block 1825. The combination of micro-machining and chamfering cooperate to result in uniform, same size, same geometry holes. The surfaces of filter 115 are polished, as per block 1830. Filter 115 is marked with a unique code, as per block 1835 and as described above. As per block 1840, the finished filter 115 is tested for compliance with respect to hole count, hole circularity and total hole cumulative area using the testing methodology taught in the flowchart of FIG. 11. The actions called for in blocks 1835 and 1840 are optional in one embodiment.

Figure 18B:
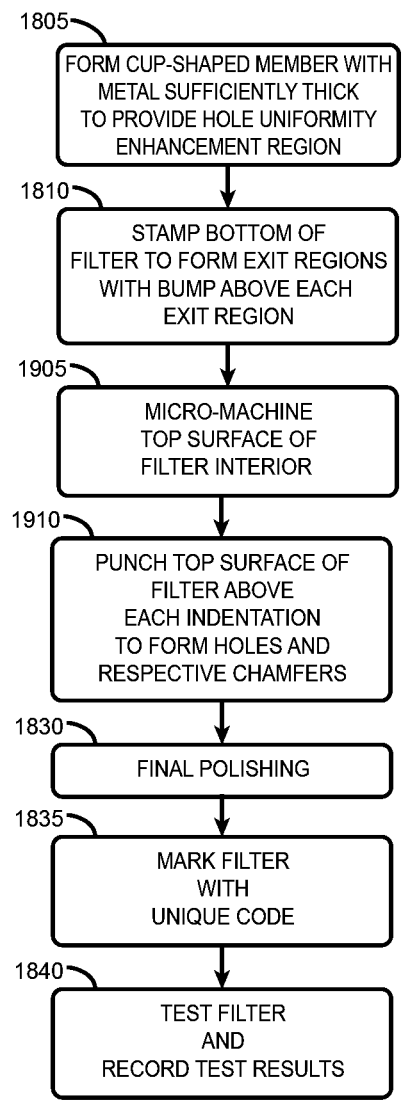

FIG. 18B depicts a flowchart of an alternative embodiment of the disclosed filter fabrication method wherein instead of drilling from the bottom surface 122B, as per block 1815, hole 125 may be formed by punching from top surface 122A down through the hole uniformity enhancement region 177 to the exit region 160 below. In one embodiment, hole 125 may be formed by a micro-punching operation. The flowchart of FIG. 18B includes a number of blocks in common with the flowchart of FIG. 18A. Like numbers indicate like blocks when comparing the flowcharts of FIGS. 18B and 18A. This embodiment, like the embodiment of FIG. 18A, starts with a cup-shaped metallic member and forms holes in a hole uniformity enhancement region of the member from the bottom side of the member. More specifically, process flow commences with forming a cup-shaped metallic member that is sufficiently thick to provide a hole uniformity enhancement region 177, as per block 1805 and as described above. Such a cup-shaped member is shown in FIGS. 14A-14C. The bottom side surface 122B of the cup-shaped member is stamped to form indentations 150 that act as exit regions 160, as per block 1810 and as described above. This stamping action forms a bump 170 above each indentation 150. In this embodiment, the top surface 122A of the filter interior is micro-machined to form micro-machined surface 122A', as per block 1905. This micro-machining action removes bumps 170 by shaving off a minute portion of top surface 122A of the filter bottom 122 to form micro-machined surface 122A'. The micro-machined top surface 120A' is punched through from the top at each exit region 160 to from a hole 125 between top surface 120A' and a respective exit region 160 below, as per block 1910. The stamp used in this punching operation is shaped to form a chamfer 179 at each hole 125 where each hole meets micro-machined surface 122A'. The combination of micro-machining, punching and chamfering cooperate to result in uniform, same size, same geometry holes. The surfaces of filter 115 are polished, as per block 1830. Filter 115 is marked with a unique code, as per block 1835 and as described above. As per block 1840, the finished filter 115 is tested for compliance with respect to hole count, hole circularity and total hole cumulative area using the testing methodology taught in the flowchart of FIG. 11.

Figure 18C:
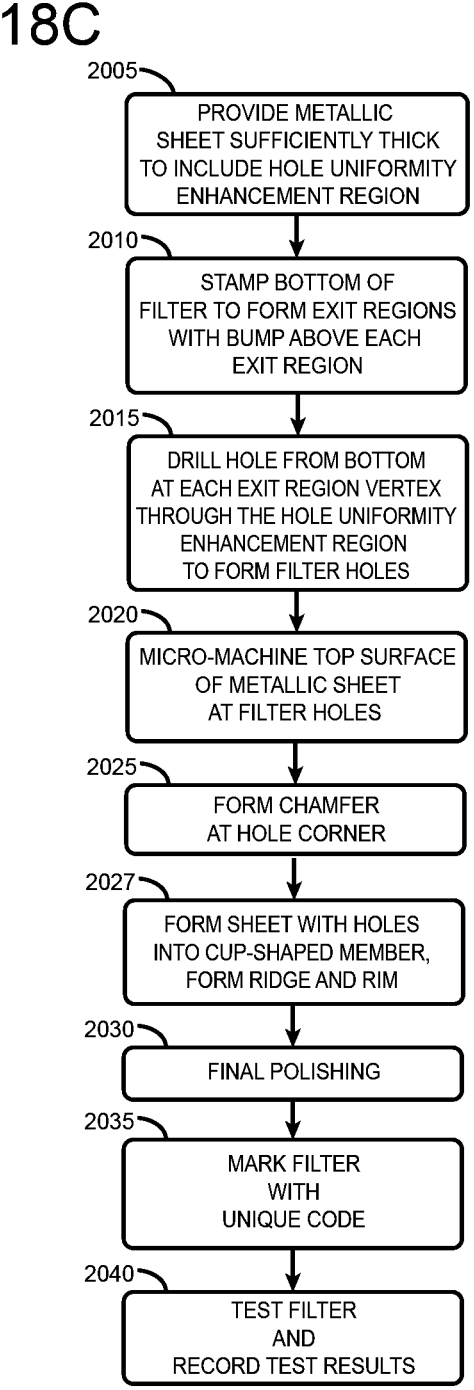

FIG. 18C is a flowchart that depicts process flow in another embodiment of the disclosed methodology that starts with a flat sheet of metallic material and forms holes in a hole uniformity enhancement region of the sheet from the bottom side of the sheet before forming the sheet into a cup-shaped filter. More specifically, process flow commences with providing a substantially flat metallic sheet that is sufficiently thick to provide a hole uniformity enhancement region 177, as per block 2005 and as described above. The geometries shown in FIGS. 17C and 17D and the corresponding discussion above are still applicable to this embodiment, except that filter bottom 122 is now part of the flat metallic sheet before the sheet is formed into a cup. The bottom side surface 122B of the metallic sheet is stamped to form indentations 150 that act as exit regions 160, as per block 2010 and as described above. This stamping action forms a bump 170 above each indentation 150. In one embodiment, a hole 125 is drilled from the bottom of the metallic sheet at each exit region vertex 162 through the hole uniformity enhancement region 177 to form the filter holes 125, as per block 2015. Laser drilling is an example of one type of drilling that may be employed to form filter holes 125. This drilling action removes most of each bump 170. The top surface 122A of the metallic sheet is micro-machined to form micro-machined surface 122A', as per block 2020. This micro-machining action shaves off a minute portion of top surface 122A of the metallic sheet bottom 122 to remove bumps 170 and form micro-machined surface 122A'. The corner of each hole is chamfered where each hole meets top surface 122A' to form chamfers 179, as per block 2025. The combination of micro-machining and chamfering cooperate to result in uniform, same size, same geometry holes. Using appropriate tooling, the metallic sheet with hole uniformity enhancement region, holes and exit regions is formed into a metallic cup-shaped member to conform to the dimensions and geometry depicted in FIG. 17A-17F, as per block 2027. Retaining ridge 149 and rim 130 are formed on the resultant filter by appropriate tooling, also as per block 2027. The surfaces of filter 115 are polished, as per block 2030. Filter 115 is marked with a unique code, as per block 2035 and as described above. As per block 2040, the finished filter 115 is tested for compliance with respect to hole count, hole circularity and total hole cumulative area using the testing methodology taught in the flowchart of FIG. 11. The actions called for in blocks 2035 and 2040 are optional in one embodiment.

Figure 18D:
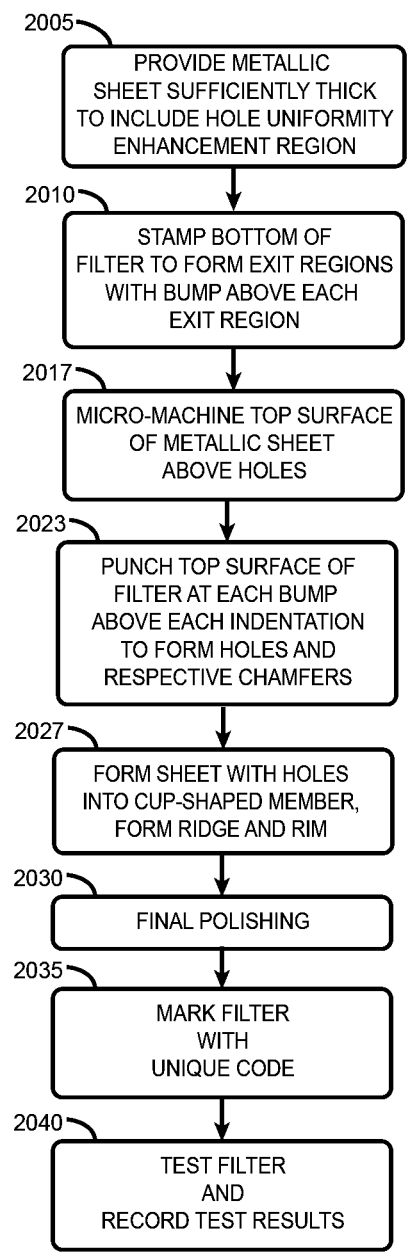

FIG. 18D depicts a flowchart of another embodiment of the disclosed methodology that starts with a flat sheet of metallic material and forms holes in a hole uniformity enhancement region of the sheet from the bottom side of the sheet before forming the sheet into a cup-shaped filter. However, instead of drilling from the bottom surface 122B, as per block 2015 of FIG. 18C, hole 125 may be formed by punching from top surface 122A down through the hole uniformity enhancement region 177 to the exit region 160 below. More particularly, in the flowchart of FIG. 18D, process flow commences with providing a flat sheet of metallic material that is sufficiently thick to include hole uniformity enhancement region 177, as per block 2005. The bottom surface 122B of the flat sheet is stamped to form indentations 150 that act as exit regions 160, as per block 2010 and as described above. This stamping action forms a bump 170 above each indentation 150. In this embodiment, the top surface 122A of the metallic sheet is micro-machined to remove bumps 170 and form micro-machined surface 122A', as per block 2017. This micro-machining action shaves off a minute portion of top surface 122A of the filter's sheet bottom 122 to form micro-machined surface 122A'. The micro-machined top surface 120A' is punched through at each bump 170 to from a hole 125 between top surface 120A' and a respective exit region 160 below, as per block 2023. The stamp used in this punching operation is shaped to form a chamfer 179 at each hole 125 where each hole meets micro-machined surface 122A'. The combination of micro-machining, punching and chamfering cooperate to result in uniform, same size, same geometry holes. Using appropriate tooling, the metallic sheet with hole uniformity enhancement region, holes and exit regions is formed into a metallic cup-shaped member to conform to the dimensions and geometry depicted in FIG. 17A-17F, as per block 2027. Retaining ridge 149 and rim 130 are formed on the resultant filter by appropriate tooling, also as per block 2027. The surfaces of filter 115 are polished, as per block 2030. Filter 115 is marked with a unique code, as per block 2035 and as described above. As per block 2040, the finished filter 115 is tested for compliance with respect to hole count, hole circularity and total hole cumulative area using the testing methodology taught in the flowchart of FIG. 11.

Using a combination of the disclosed filter qualification system 200 and the coffee refractometer described in my patent application, application Ser. No. 12/247,232 entitled "Coffee Refractometer Method and Apparatus" and the universal coffee brewing chart methodology described in my patent application, application Ser. No. 12/247,231 entitled "Method and Apparatus for Brewing Coffee Via Universal Coffee Brewing Chart Generation", a method was developed for tuning a filter's performance to coffee particle size and coffee height at the traditional pressures of 8-9 BARs and 93.5° C. at the group head 1205. Each filter 115 is designed for a narrow range of capacity, for example 22-24 grams, 18-20 grams or 15-17 grams of coffee and to extract at the traditional setting ranges of:
1) ~10% for A Normale, at 19-20% Extraction Yield, 50% Espresso Brew Formula;
2) ~6.5% for a Lungo, at 20-21% Extraction Yield, 33% Espresso Brew Formula, and
3) ~13% for a Ristretto, at 18-19% Extraction Yield, 66% Espresso Brew Formula Moreover, the range of coffee particle grind size required for each filter is narrowed so that adjustments between filter sizes are minimized.

With respect to filter gram capacity: each filter 115 is designed to perform within these three narrow ranges of capacity, because they are a fixed and specific volume in cubic centimeters. Coffee densities vary, but generally are within 0.50-0.55 gr/cc. The actual final weight varies by the density of the coffee, not by over- or under-dosing the filter. For example, a high-elevation grown single origin coffee might weigh 24 g when filled to capacity, while a softer or blended coffee weighs only 22 g when filled to the same height. Fill height is designed to be 2-mm below a screen of group head 1205 when evenly dispersed, settled and tamped, as shown in FIG. 12C. The user should reach this height when the espresso coffee 148 is dosed loosely to fill filter 115 to its rim 130, allowing the coffee to settle, and then wiping excess off and finally tamping the coffee 148. In one embodiment, the holes 125 in filter 115 are spaced to provide a substantially uniform exit area under the entire puck of coffee 148.

In one embodiment, the holes and exit regions of the coffee filter may be fabricated as a wedge wire configuration. In that case, the wedge wire configuration provides effective hole sizes and total cumulative hole area to the filter arrangement discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should also be noted that, in some alternative implementations, the functions noted in the blocks of the flowcharts of FIG. 18A-18D may occur out of the order shown in FIG. 18A-18D. For example, two blocks shown in succession may, in fact, be executed substantially concurrently, or the blocks may sometimes be performed in reverse order, or another order, depending upon the tooling methodology selected.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of fabricating a coffee filter, comprising:
forming a plurality of tapered exit regions in a substantially flat first portion of a metallic member, the substantially flat first portion including first and second opposed major surfaces, the plurality of tapered exit regions extending from the second major surface of the substantially flat first portion to respective vertices interior to the substantially flat first portion;
providing a hole uniformity enhancement region extending between the first major surface of the substantially flat first portion and the vertices of the plurality of exit regions;
forming respective holes that extend from the vertices of the plurality of tapered exit regions through the hole uniformity enhancement region to the first major surface of the substantially flat first portion; and
micro-machining the first major surface of the substantially flat first portion to remove a part of the hole uniformity enhancement region to a predetermined depth into the hole uniformity enhancement region, thus forming a micro-machined first major surface, wherein the predetermined depth is selected to prevent the micro-machined first major surface from meeting the tapered exit regions to maintain uniformity of the holes.

2. The method of claim 1, wherein the metallic member exhibits a thickness of 0.6 mm plus or minus approximately 0.05 mm.

3. The method of claim 1, wherein the forming of the plurality of tapered exit regions comprises stamping the second major surface to form a respective indentation for each exit region, a respective bump being formed in the first major surface adjacent each indentation, thus forming a plurality of bumps in the first major surface.

4. The method of claim 3, wherein the micro-machining of the first major surface removes the plurality of bumps in the first major surface.

5. The method of claim 1, wherein the forming of the respective holes comprises punching the first major surface above each exit region to form the respective holes.

6. The method of claim 1, wherein the forming of the respective holes comprises drilling through the vertices of the exit regions to the first major surface.

7. The method of claim 1, further comprising forming a respective chamfer for the respective holes at the first major surface.

8. The method of claim 1, wherein the plurality of tapered exit regions exhibit tapered walls with angles within the range of approximately 30 degrees to approximately 60 degrees from a normal to the first major surface of the bottom.

9. The method of claim 1, wherein the plurality of tapered exit regions exhibit a pyramidal geometry.

10. The method of claim 1, wherein the plurality of tapered exit regions exhibit a conical geometry.

11. The method of claim 1, wherein the holes of the coffee filter exhibit a diameter that is paired with a particular coffee particle grind size to harmonize the coffee filter with the particular coffee particle grind size and a height of coffee within the coffee filter.

12. The method of claim 1, further comprising marking a unique marking code on the coffee filter.

13. A method of fabricating a coffee filter, comprising:
   forming a plurality of tapered exit regions in a substantially flat first portion of a metallic member, the substantially flat first portion including first and second opposed major surfaces, the plurality of tapered exit regions extending from the second major surface of the substantially flat first portion to respective vertices interior to the substantially flat first portion;
   providing a hole uniformity enhancement region extending between the first major surface of the substantially flat first portion and the vertices of the plurality of exit regions;
   micro-machining the first major surface of the substantially flat first portion to remove a part of the hole uniformity enhancement region to a predetermined depth into the hole uniformity enhancement region, thus forming a micro-machined first major surface, and
   forming respective holes that extend from the micro-machined first major surface of the substantially flat first portion through the hole uniformity enhancement region to the vertices of the plurality of tapered exit regions, wherein the predetermined depth of the micro-machined first major surface is selected to prevent the micro-machined first major surface from meeting the tapered exit regions to maintain uniformity of the holes.

14. The method of claim 13, wherein the metallic member exhibits a thickness of 0.6 mm plus or minus approximately 0.05 mm.

15. The method of claim 13, wherein the forming of the plurality of tapered exit regions comprises stamping the second major surface to form a respective indentation for each exit region, a respective bump being formed in the first major surface adjacent each indentation, thus forming a plurality of bumps in the first major surface.

16. The method of claim 15, wherein the micro-machining of the first major surface removes the plurality of bumps in the first major surface.

17. The method of claim 13, wherein the forming of the respective holes comprises punching the micro-machined first major surface above each exit region to form the respective holes.

18. The method of claim 13, wherein the forming of the respective holes comprises drilling through the vertices of the exit regions to the first major surface.

19. The method of claim 13, further comprising forming a respective chamfer for the respective holes at the micro-machined first major surface.

20. The method of claim 13, wherein the plurality of tapered exit regions exhibit tapered walls with angles within the range of approximately 30 degrees to approximately 60 degrees from a normal to the first major surface of the bottom.

21. The method of claim 13, wherein the plurality of tapered exit regions exhibit a pyramidal geometry.

22. The method of claim 13, wherein the plurality of tapered exit regions exhibit a conical geometry.

23. The method of claim 13, wherein the holes of the coffee filter exhibit a diameter that is paired with a particular coffee particle grind size to harmonize the coffee filter with the particular coffee particle grind size and a height of coffee within the coffee filter.

24. The method of claim 13, further comprising marking a unique marking code on the coffee filter.

* * * * *